(12) United States Patent
Gyani

(10) Patent No.: US 11,712,968 B2
(45) Date of Patent: Aug. 1, 2023

(54) METHOD FOR DETECTING DAMAGE TO BATTERY PACK ENCLOSURE DURING A CRASH EVENT

(71) Applicant: NIO Technology (Anhui) Co., Ltd., Anhui (CN)

(72) Inventor: Parth Sanjiv Gyani, San Jose, CA (US)

(73) Assignee: NIO Technology (Anhui) Co., Ltd., Hefei (CN)

(*) Notice: Subject to any disclaimer, the term of this patent is extended or adjusted under 35 U.S.C. 154(b) by 676 days.

(21) Appl. No.: 16/719,423

(22) Filed: Dec. 18, 2019

(65) Prior Publication Data

US 2021/0188093 A1 Jun. 24, 2021

(51) Int. Cl.
*H01M 50/20* (2021.01)
*B60L 3/00* (2019.01)
*H01M 10/42* (2006.01)
*B60L 50/64* (2019.01)

(52) U.S. Cl.
CPC ............. *B60L 3/0046* (2013.01); *B60L 50/64* (2019.02); *H01M 10/4257* (2013.01); *B60L 2250/10* (2013.01)

(58) Field of Classification Search
CPC .................... H01M 50/20; H01M 10/4257
See application file for complete search history.

(56) References Cited

U.S. PATENT DOCUMENTS

| 5,250,904 | A | 10/1993 | Salander et al. |
| 6,168,880 | B1 | 1/2001 | Snyder et al. |
| 6,411,063 | B1* | 6/2002 | Kouzu ............... H01M 50/20 320/150 |
| 9,046,580 | B2 | 6/2015 | Hermann |
| 2013/0027049 | A1 | 1/2013 | Sukup |
| 2016/0126535 | A1 | 5/2016 | Qiao et al. |
| 2019/0131671 | A1* | 5/2019 | Lorenz ............... B60L 50/64 |
| 2020/0083515 | A1* | 3/2020 | Lejosne ............ H01M 10/4235 |

\* cited by examiner

*Primary Examiner* — Olatunji A Godo
(74) *Attorney, Agent, or Firm* — Sheridan Ross PC

(57) ABSTRACT

A battery pack enclosure, a battery module, and a method are provided to detect damage to in a crash event. The battery pack enclosure may include a plurality of battery modules, wherein each battery modules includes a plurality of adjacent battery cells. The battery pack enclosure may also include a sensor and an electronic control unit electronically connected to the sensor, the electronic control unit configured to monitor the sensor to detect damage to the battery pack enclosure. The sensor may comprise a mesh of resistive wires, and the electronic control unit monitors the overall resistance of the mesh resistive wires. The overall resistance of the mesh resistive wires can be used to determine whether there is damage to the battery pack enclosure. If damage is detected, the damage can further be located, and an alert sent.

20 Claims, 15 Drawing Sheets

METHOD FOR DETECTING DAMAGE TO BATTERY PACK ENCLOSURE DURING A CRASH EVENT

FIELD

The present disclosure is generally directed to energy storage devices, in particular, toward batteries and battery modules for electric vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

Vehicles employing at least one electric motor and power system store electrical energy in a number of on-board energy storage devices. These vehicle energy storage devices are generally arranged in the form of electrically interconnected individual battery modules containing a number of individual battery cells. The battery modules are generally connected to an electrical control system to provide a desired available voltage, ampere-hour, and/or other electrical characteristics to a vehicle. In some cases, one or more of the battery modules in a vehicle can be connected to a battery management system that is configured to monitor the voltage sensed from each cell in the battery module and/or the entire battery.

Electric vehicles are dependent on the integrity and reliability of the on-board electrical energy power supply and energy storage devices. Typical vehicle energy storage devices include a battery enclosure that is composed of a number of battery modules and each of these battery modules may include tens, if not hundreds, of battery cells. As can be appreciated, the chance of failure in a system is proportionate to the number of components, interconnections, and connection modes, etc., in the energy storage devices of a vehicle.

DETAILED DESCRIPTION

Figure 1:
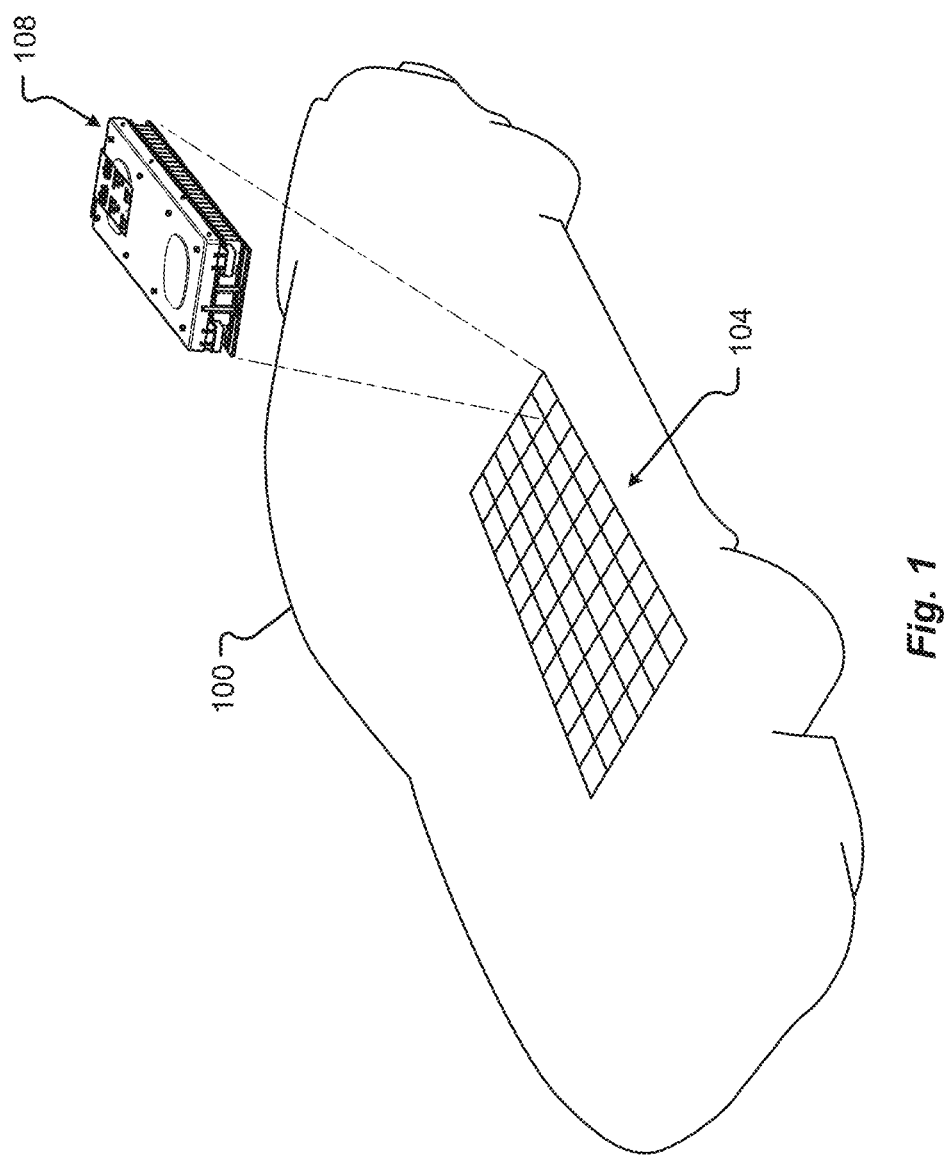
FIG. 1 shows a schematic perspective view of an electrical energy storage system in a vehicle in accordance with embodiments of the present disclosure.

Embodiments of the present disclosure will be described in connection with electrical energy storage devices, and in some embodiments the construction, structure, and arrangement of components making up a battery pack enclosure for an electric vehicle drive system.

An electrical energy storage device for a vehicle may include at least one battery pack enclosure including a number of battery modules electrically interconnected with one another to provide electromotive force for the electrical drive system of a vehicle to operate. Each battery module in the at least one battery pack enclosure can include any number of battery cells contained and/or arranged within a battery module housing. Conventional battery module housings may include a base and a cover which are attached at a periphery of the battery module via one or more fasteners. Because these conventional housings are designed to maximize the number of battery cells contained therein, all of the fasteners and attachments are moved to an outer periphery of the housing, and the cover and base are generally made from thick plastic or metal to provide structural rigidity and integrity.

Typically, the housing of the battery pack enclosure and/or battery modules provide protection against mechanical damage in the event of a crash event. However, damage to the battery enclosure, battery modules, and/or battery cells may still occur and in some situations the damage may go undetected. When there is a failure in the battery pack enclosure, battery module(s), and/or battery cell(s), the damaged unit(s) may vent, which may cause a thermal propagation event. However, there may be a period between the occurrence of the damage and the thermal propagation event.

The present disclosure describes a battery pack enclosure, a battery module, and a method for detecting damage to a battery pack enclosure during a crash event. For example, an obstacle (e.g., speed bump) or other debris (e.g., rock, trash, scrape wood, scrape metal, etc.) in the pathway of a vehicle may cause damage to the undercarriage of the vehicle, the damage may go undetected (e.g., not obvious from a visual inspection). In some embodiments, the present disclosure describes a method of monitoring a sensor in the battery enclosure to detect damage to the battery enclosure. The sensor may be formed between the plurality of battery modules and an inside surface of the battery enclosure. The sensor may be used to detect and/or measure deformation to the bottom of a battery pack enclosure. An electronic control unit may be electronically connected to the senor and configured to monitor the sensor to detect damage.

In one embodiment, the sensor may comprise a mesh of resistive wires, and the electronic unit is configured to monitor the overall resistance of the mesh of resistive wires. The resistance of a wire is proportional to the length, but inversely proportional to the cross-sectional area. Therefore, one may calculate the resistance of a wire using three parameters of the wire: resistivity ($\rho$); length (L); and cross-sectional area (A).

$$R = \frac{\rho L}{A}$$

Damage to the enclosure may also cause damage to the mesh of resistive wires, if the mesh of resistive wires is damaged (e.g., strands breaking, disconnecting, elongating, etc.) its overall resistance will change. Therefore, by monitoring the overall resistance of the mesh of resistive wires, damage to the battery pack enclosure may also be detected. In some embodiments, damage is detected when there is a change in the overall resistance that exceeds a predetermined threshold for a predetermined period of time. In some embodiments, the sensor may measure other parameters such as temperature, range, time, etc.

In some examples, the mesh of resistive wires is formed of copper, nickel, and/or some other conductive material. Copper may be a cost-effective material and may implemented using existing technology. The mesh of resistive wires may be comprised of thin wires connected to a battery management system (BMS) of the vehicle, which monitors the overall resistance of the mesh. In some embodiments, the monitoring is performed at the battery module level.

Among other things, the sensor may detect damage to the battery enclosure 104 and/or the battery module 108 before a thermal propagation event occurs by detecting a change in the overall resistance of the battery pack enclosure 104. In some cases, the battery modules 108 each has a separate and independent sensor that allows the specific battery module that is damaged to be located and/or disabled.

The upper and lower covers of the battery pack enclosure may be configured as thin dielectric (e.g., plastic, composite, or other electrically nonconductive or insulative material, etc.) components that house the battery modules.

At least one benefit of the embodiments described herein is observed in the event of a crash event. For example, by monitoring a sensor that is located between the bottom cover of the battery pack enclosure and the battery module, damage that may not be visually detectable may be detected before a thermal propagation event occurs. As can be appreciated, this early detection of damage provides a safer battery enclosure assembly and battery for a vehicle since it is less likely that damage to a battery module would cause a thermal event or a non-passive failure in the energy storage device of the vehicle.

In some embodiments, the present disclosure provides a battery module including a plurality of adjacent battery cells. The battery module also includes a sensor between the plurality of adjacent battery cells and an inside surface of a battery enclosure. The battery module further includes an electronic unit electronically coupled to the sensor, configured to monitor the sensor to detect damage to the battery module.

In some embodiments, the present disclosure provides a method of detecting damage to a battery enclosure. The method comprises monitoring a sensor between a plurality of battery modules and an inside surface of the batter enclosure, wherein each battery module of the plurality of battery modules includes a plurality of adjacent battery cells. The method further comprises detecting damage to the battery enclosure.

In some embodiments, the present disclosure describes a sensor for detecting damage that is retained in the housing of a battery pack enclosure. The sensor may be configured to locate damage to the battery pack enclosure prior to the detection of a thermal propagation event. The sensor may be a part of, or integral to, the housing and/or cover of the battery pack. In some embodiments the sensor comprises a mesh of resistive wires, and a change in the overall resistance of the mesh of resistive wires is indicative of damage to the battery enclosure and/or battery module.

Referring to FIG. 1, a schematic perspective view of an electrical energy storage system, or battery pack enclosure 104 comprising a number of electrical energy storage devices, or battery modules, 108 is shown in accordance with embodiments of the present disclosure. In one embodiment, the battery pack enclosure 104 may be configured to provide the electromotive force needed for the electrical drive system of a vehicle 100 to operate. Although the present disclosure recites battery modules 108, and/or battery cells 208 as examples of electrical energy storage units, embodiments of the disclosure should not be so limited. For example, the battery modules 108, and/or any other energy storage device disclosed herein, may be any electrical energy storage cell including, but in no way limited to, battery cells 208, capacitors, ultracapacitors, supercapacitors, etc., and/or combinations thereof.

In some embodiments, the battery modules 108 may be electrically interconnected via at least one battery busbar including high voltage positive and negative terminals connected to an electrical system of the vehicle 100. The battery pack enclosure 104 may be configured as any number of battery modules 108 that are capable of being electrically connected together.

Figure 2A:
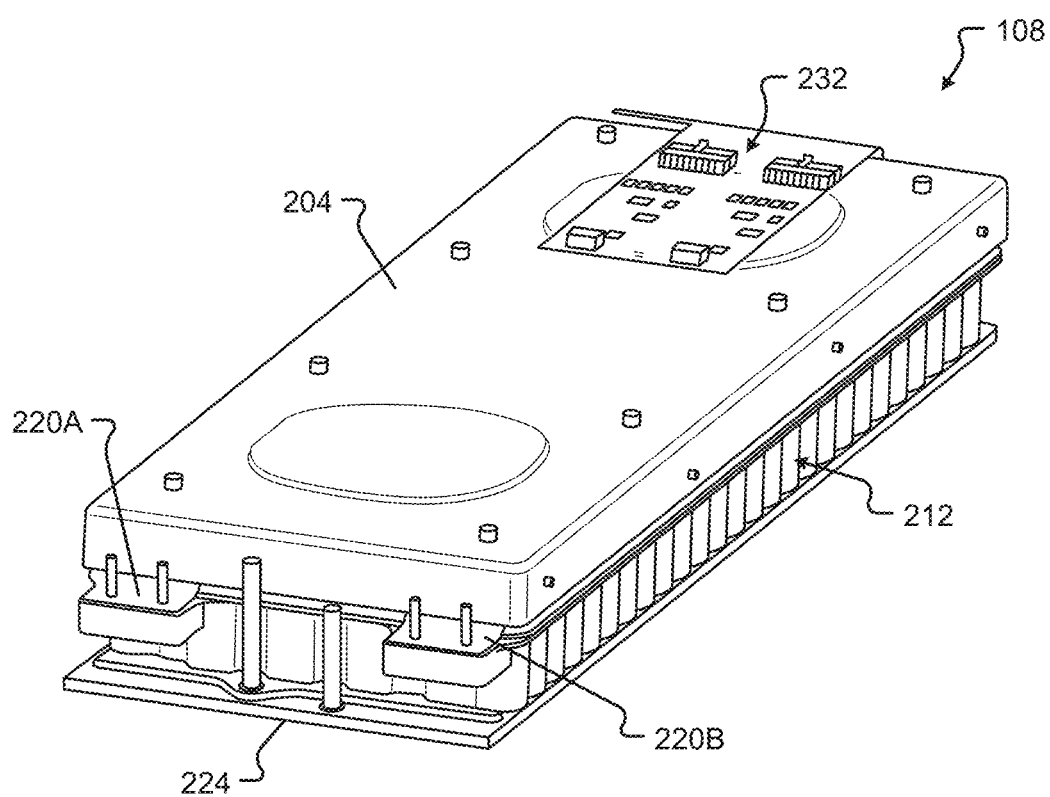
FIG. 2A shows a perspective view of a battery module in accordance with embodiments of the present disclosure.
Figure 2B:
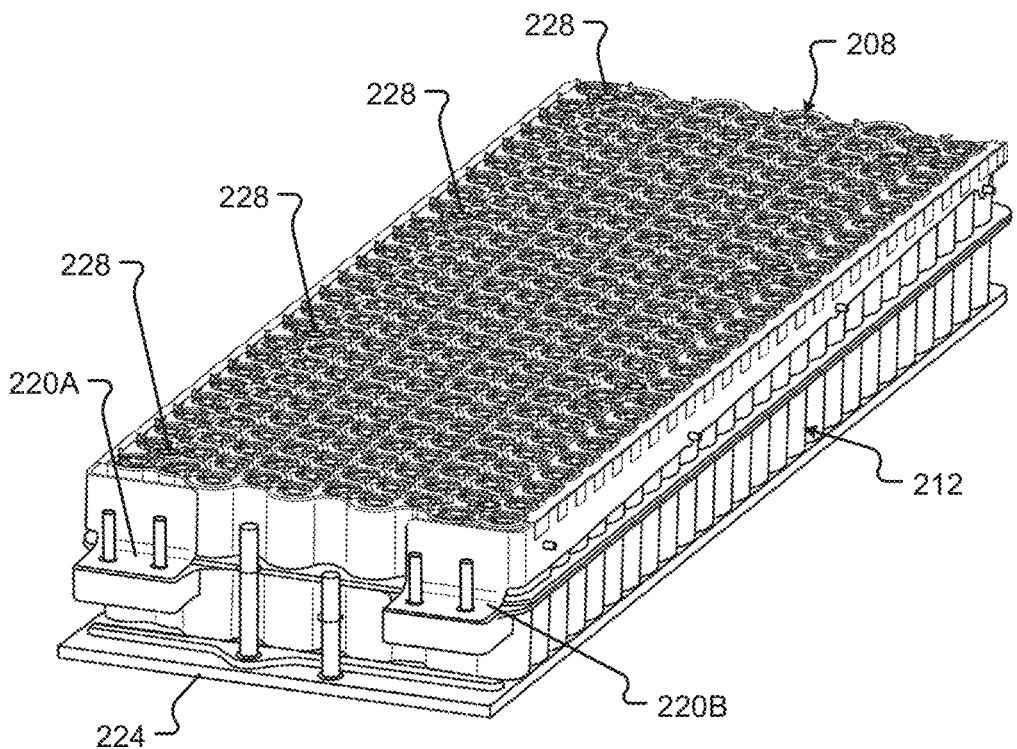
FIG. 2B shows a perspective view of the battery module of FIG. 2A with an upper shield removed.
Figure 2C:
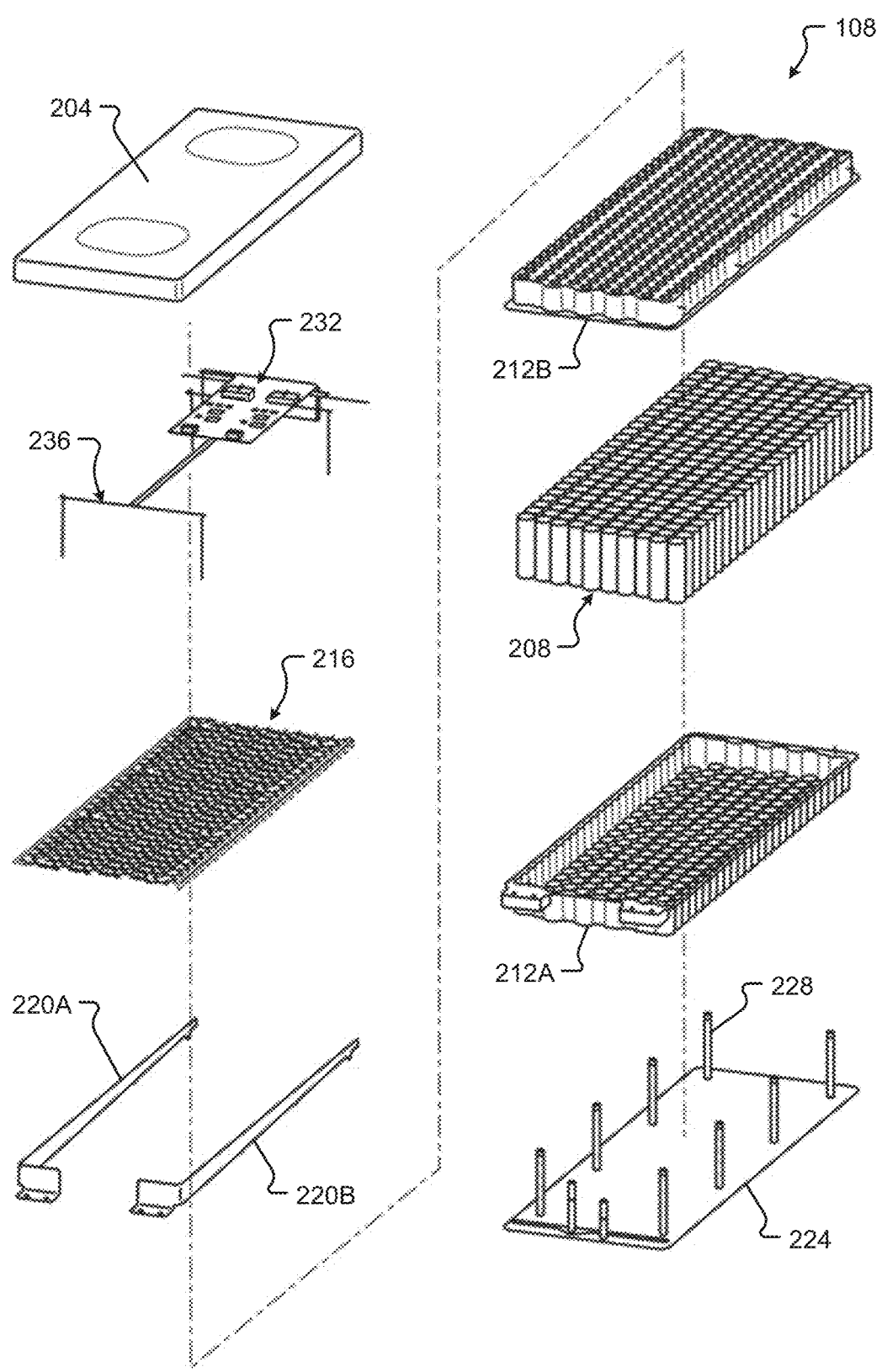
FIG. 2C shows a perspective exploded view of the battery module of FIG. 2A.

FIGS. 2A-2C show various perspective views of a battery module 108 in accordance with embodiments of the present disclosure. The battery module 108 may comprise an upper shield 204, a plurality of battery cells 208, a housing or carrier 212 configured to contain the battery cells 208, battery cell interconnects 216, first and second battery module busbars 220A, 220B, a cooling plate 224, and one or more mount sleeves 228. In some embodiments, the battery module 108 may include a battery management system 232 and sensing system 236.

FIG. 2A shows a perspective view of a battery module 108 in accordance with embodiments of the present disclosure. The battery module 108 shown in FIG. 2A includes an upper shield 204 configured to substantially cover the battery cell interconnects 216, battery cells 208, and other electrical connections (e.g., first and second battery module busbars 220A, 220B, etc.). In some embodiments, the upper shield 204 may correspond to a drip shield. In any event, the upper shield 204 may be made from molded, formed, or otherwise shaped plastic, dielectric, or nonconductive material. In one embodiment, the battery management system (BMS) 232 electronics (e.g., printed circuit board, chips, etc.) may be mounted to an exterior or interior surface of the upper shield 204. As shown in FIG. 2A, the BMS 232 and corresponding electronics are mounted to an exterior surface (e.g., a surface separate and spaced apart from the battery cells 208 and battery cell interconnects 216, etc.).

FIG. 2B shows a perspective view of the battery module 108 of FIG. 2A with the upper shield 204, BMS 232, and other electronics removed for the sake of clarity. As shown in FIG. 2B, the first and second battery module busbars 220A, 220B extend from a high voltage connection end, including two connection standoffs per busbar 220A, 220B, along the length of the battery module 108 to the opposite end of the battery module 108.

In FIG. 2C, the housing 212 is shown having a lower housing 212A and an upper housing, or cover, 212B. In some embodiments, the lower housing 212A and cover 212B may be interconnected with one another to form the complete housing 212. As shown in FIG. 2C, the lower housing 212A and/or the cover 212B may be configured to at least partially contain a number of battery cells 208. For instance, both the lower housing 212A and the cover 212B include a number of surfaces and walls defining battery cell 208 containment cavities including volumes for receiving the battery cells 208. Both the lower housing 212A and cover 212B may include a number of receptacles sized to receive and arrange each of the battery cells 208 relative to one another. In one embodiment, the lower housing 212A and cover 212B may include receptacles, or apertures, configured to receive one or more fasteners and mount sleeves 228.

Figure 3:
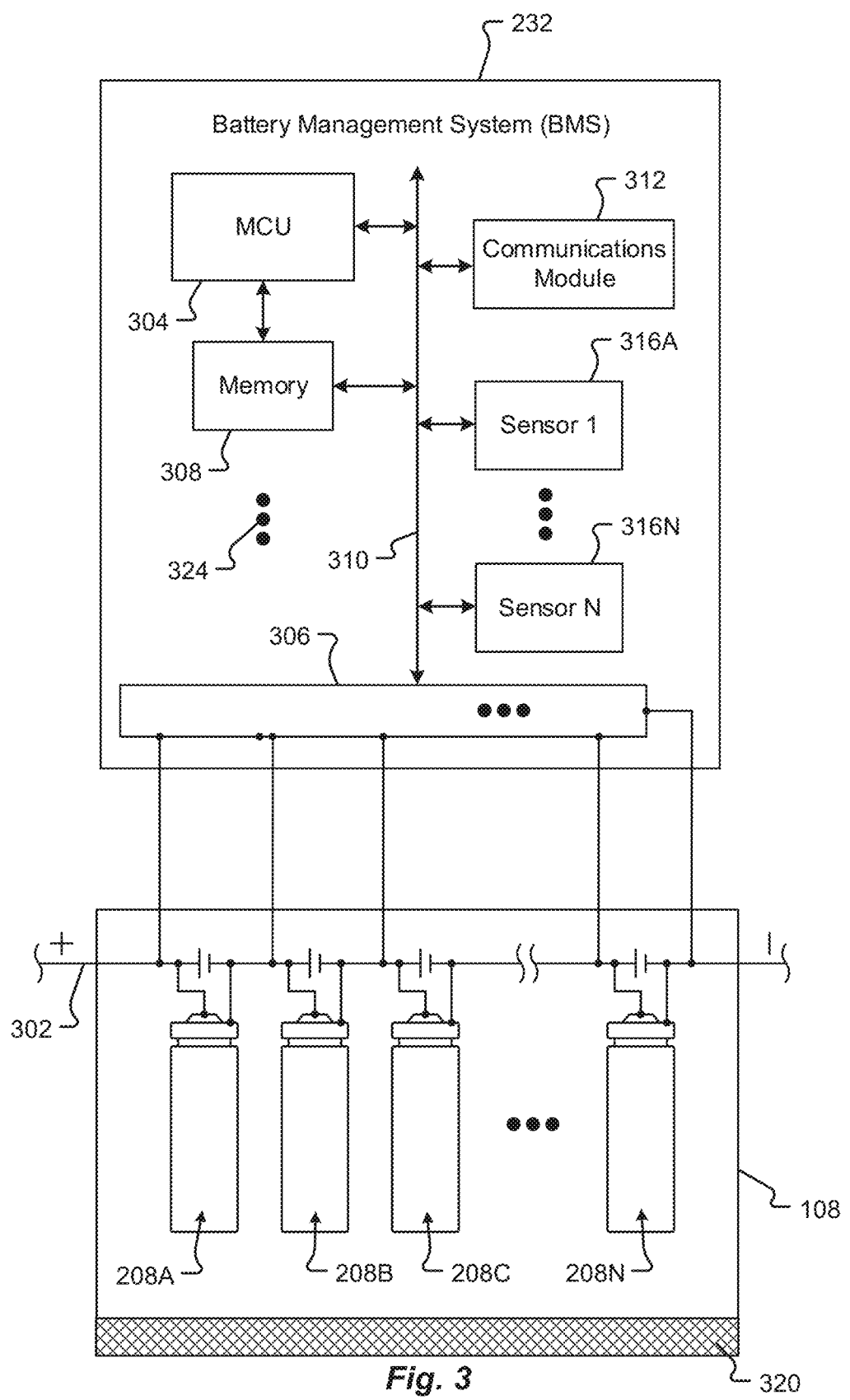
FIG. 3 shows a schematic block diagram of the battery management system in accordance with embodiments of the present disclosure.

FIG. 3 shows a schematic block diagram of the BMS 232 interconnected with the battery module 108 in accordance with embodiments of the present disclosure. In some embodiments, each battery module 108 of a battery pack enclosure 104 may include a corresponding unique BMS 232. In other embodiments, the multi-module battery pack enclosure 104 comprising a number of battery modules 108 may be monitored and/or controlled by a single multi-module BMS.

The BMS 232 may include a bus 306 including a number of terminals configured to interconnect with electrical lines 302 interconnected with the battery cells 208 of the battery module 108. In some embodiments, the interconnection between the battery module 108 and the BMS 232 may be via a physical electrical connector disposed on the battery module 108, the BMS 232, and/or both the battery module 108 and the BMS 232. The BMS 232 may be configured to monitor and/or control a state of charge associated with each battery cell 208A-N in the battery module 108. In some embodiments, the BMS 232 may include a microcontroller unit (MCU) 304, including one or more processors, interconnected with a memory 308 via at least one connection, or communications bus 310. The memory 308 may be one or more disk drives, optical storage devices, solid-state storage devices such as a random-access memory (RAM) and/or a read-only memory (ROM), which can be programmable, flash-updateable and/or the like.

Additionally or alternatively, the BMS 232 may include a communications module 312, one or more sensors 316A-N, and/or other components 324 interconnected with the communication bus 310, charger (not shown), and/or other systems in an electric power distribution system (not shown). In some embodiments, one of the sensors 316A-N may comprise the sensor of the present disclosure to detect damage to the battery pack enclosure 104 and/or the battery module(s) 108. For example, sensor 316A may monitor an overall resistance to a mesh of resistive wires, wherein a change in the overall resistance may indicate damage to the battery pack enclosure 104 and/or the battery module(s) 108. The communications module 312 may include a modem, a network card (wireless or wired), an infra-red communication device, etc. and may permit data to be exchanged with a network and/or any other charger or processor in the electric power distribution system as described.

In any event, pairs of electrical interconnections may provide voltages from the battery module 108 to the MCU 304 of the BMS 232 and these voltages may be used to determine a state (e.g., voltage, current, state of charge, etc.) associated with a particular battery cell 208A-N in the battery module 108.

Examples of the processors as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Infineon TriCore™ processors, other industry-equivalent processors, and may perform computational functions using any known or future-developed standard, instruction set, libraries, and/or architecture.

In one embodiment, the sensors 316A-N may include one or more damage detection sensors, thermocouples, pressure sensors, etc. The sensors 316A-N may be disposed between and/or in contact with, one or more of the battery cells 208A-N and the inside of the bottom cover of the battery enclosure.

As shown in FIG. 3, a mesh of resistive wires 320 is disposed between adjacent battery cells 208A-N and the bottom of the battery module 108.

Figure 4:
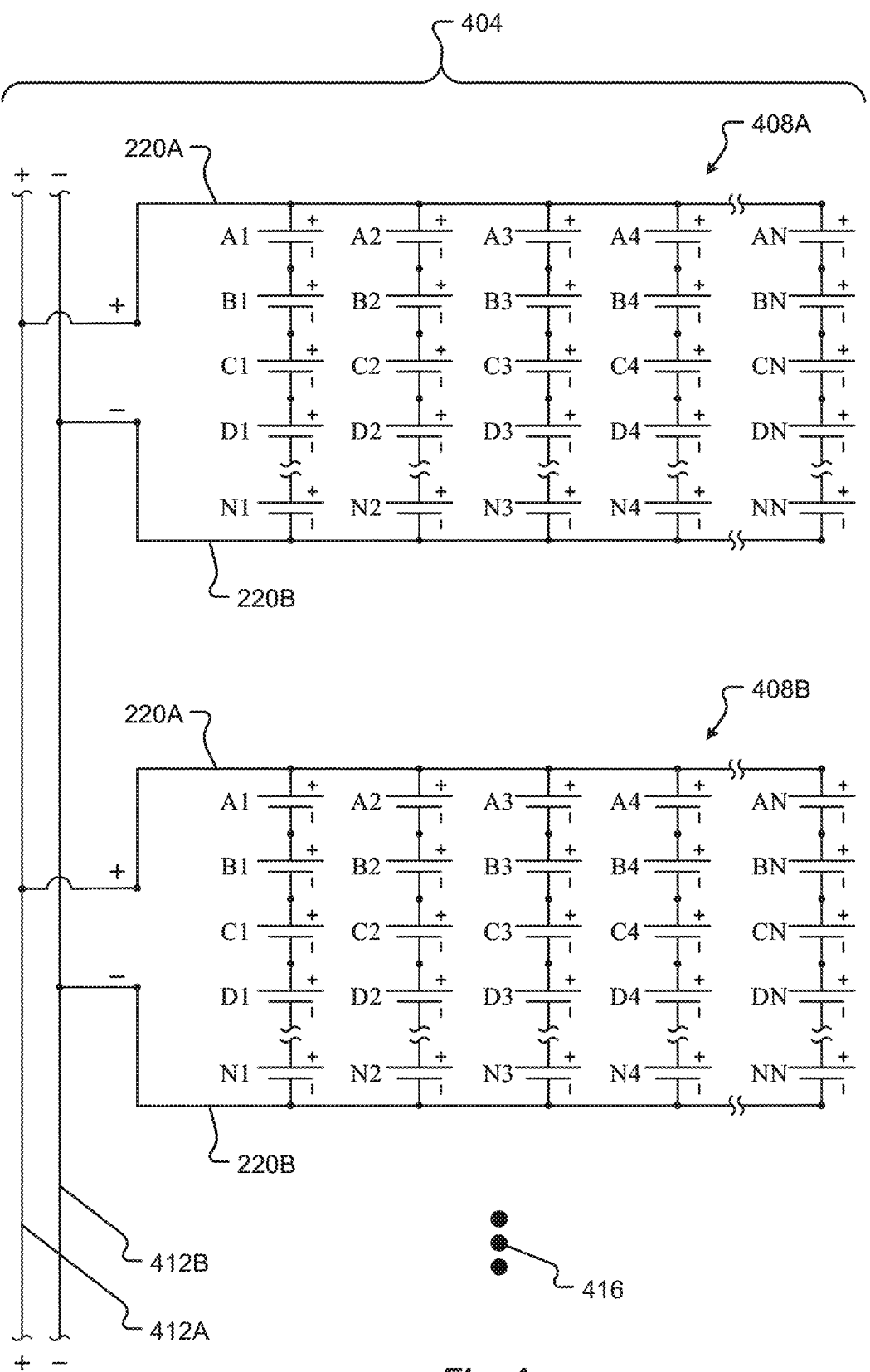
FIG. 4 shows a schematic diagram of a battery in accordance with embodiments of the present disclosure.

Referring now to FIG. 4, a schematic diagram of a battery 404 is shown in accordance with embodiments of the present disclosure. The battery 404 and/or the battery modules 408A-B described in conjunction with FIG. 4 may refer to the battery pack enclosure 104 and/or battery modules 108 as elsewhere described herein. The battery 404 may comprise a number of battery modules 408A, 408B, 416 electrically interconnected with one another via a first high voltage connection 412A and a second high voltage interconnection 412B. The first and second high voltage connections 412A, 412B may correspond to the positive and negative high voltage busbars for an electric vehicle battery. As provided above, each battery module 408, 108 may include a first battery module busbar 220A and a second battery module busbar 220B. In one embodiment the battery modules 408A, 408B, 416, 108 may be interconnected to the first and second high voltage connections 412A, 412B via the first and second battery module busbars 220A, 220B, respectively.

As illustrated in the schematic diagram of FIG. 4, each battery module 408A, 408B, 416, 108 may include any number of series-connected battery cells in a number of parallel-connected columns. For example, each battery module 408A, 408B shown in FIG. 4 includes rows 1-N and columns A-N, where N includes any non-zero positive rational number. The serial nature of the battery cells shown in each column provides the total voltage (e.g., electrical potential) for the battery module 408A, 408B, 416, 108, the parallel nature of the columns provides increased current for the battery module 408A, 408B, 416, 108, which allows for the calculation of the total power (e.g., wattage) of the battery module 108. Adding the power of the battery modules 408A, 408B, 416 together provides the total power for the battery 404.

Figure 5A:
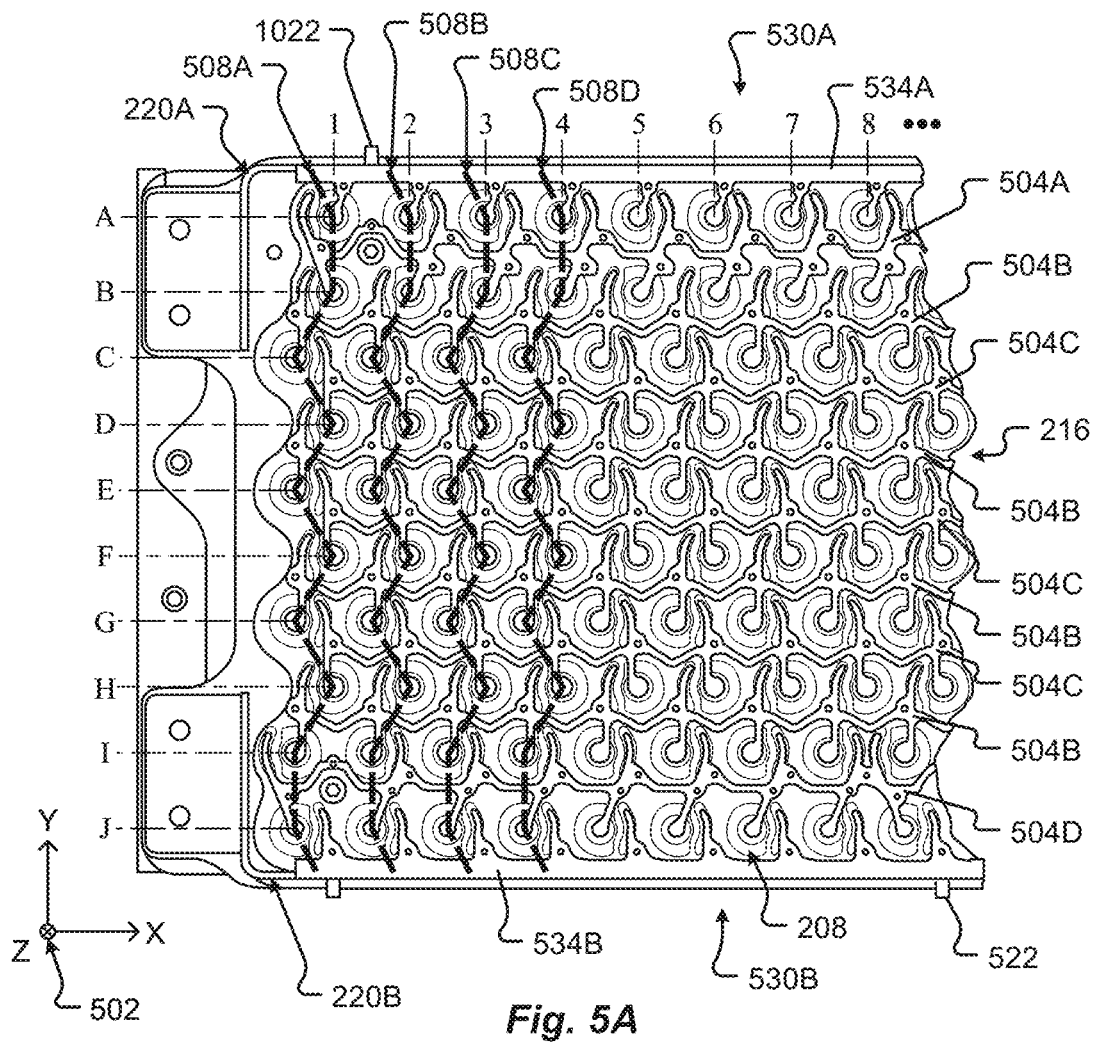
FIG. 5A shows a broken plan view of the battery module and cell-to-cell electrical interconnections in accordance with embodiments of the present disclosure.
Figure 5B:
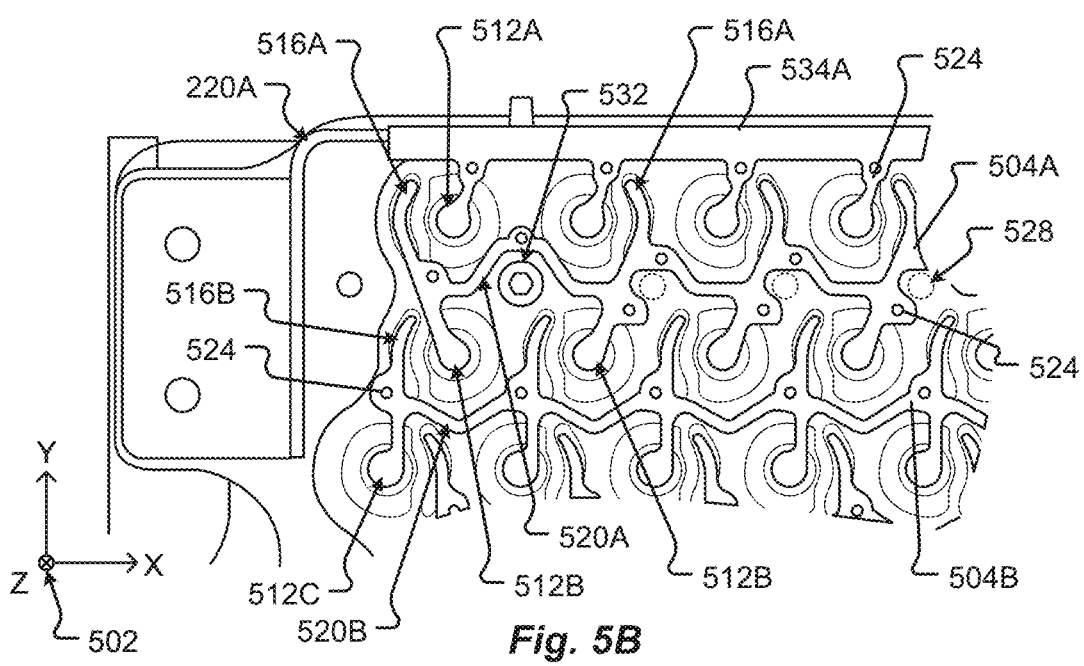
FIG. 5B shows a detail of the broken plan view of the battery module shown in FIG. 12A.

Referring to FIGS. 5A and 5B, various plan views of the battery module 108 and cell-to-cell electrical interconnections 216 are shown in accordance with embodiments of the present disclosure. As described herein, the battery module 108 may comprise an array of battery cells 208 arranged in a matrix, or other, configuration including a number of horizontal rows running along the X-axis direction (e.g., represented by letters A-J in FIG. 5A) and a number of vertical rows running substantially along the Y-axis direction (e.g., represented by numbers 1-8, etc. in FIG. 5A). In some embodiments, the vertical rows of series-connected battery cells 208 may be referred to as "columns" of battery cells 208. As can be appreciated, individual battery cells 208 in the array of battery cells 208 and/or battery module 108 may be referred to herein by their horizontal row position and their vertical row position. For instance, the battery cell shown in the top leftmost position of the battery module 108 illustrated in FIGS. 5A and 5B may be referred to as battery cell A1, while the battery cell shown in the lower leftmost position of the battery module 108 may be referred to as battery cell J1.

As shown in FIG. 5A, a number of battery cells 208 arranged in a vertical row (e.g., numbers 1-8, etc.) may be electrically-connected to one another in series (e.g., connecting the positive terminal of a first battery cell in the vertical row to the negative terminal of an adjacent battery cell in the vertical row, and the positive terminal of the adjacent battery cell in the vertical row to the negative terminal of yet another adjacent battery cell in the vertical row, and so on, etc.) via one or more cell-to-cell electrical interconnections 216.

For example, the first vertical row (e.g., row 1) may be electrically interconnected along a connected path 508A (shown as a dashed line) from the first battery cell A1 to the last battery cell J1, in the vertical row. In this example, the battery cells 208 are connected in order, A1-B1-C1-D1-E1-F1-G1-H1-I1-J1, from the first terminal side 530A to the second terminal side 530B, or vice versa. The second vertical row (e.g., row 2 shown in FIG. 5A) may be electrically interconnected along a connected path 508B from the first battery cell A2 to the last battery cell J2, in the vertical row. In this example, the battery cells 208 are connected in order, A2-B2-C2-D2-E2-F2-G2-H2-I2-J2, from the first terminal side 530A to the second terminal side 530B of the battery module 108, or vice versa. As described above, the electrically connected paths 508A and 508B, and rows 1 and 2, are arranged electrically-parallel to one another. While only four electrically connected paths 508A-D are shown in FIG. 5A (for the sake of clarity), it should be appreciated, that the number of parallel rows (e.g., 1-8, etc.) and electrically connected paths (e.g., 508A-D, etc.) may extend along the length, LB, of the battery module 108 and/or the tapered busbars 220A, 220B.

In some embodiments, the positive terminals of each vertical row of battery cells 208 (e.g., rows 1-8, etc.) may electrically interconnect to the first battery module busbar 220A at the first terminal side 530A of the battery module 108 (e.g., via a first edge row interconnection busbar 534A including one or more legs attached to the first battery module busbar 220A). Additionally or alternatively, the negative terminals of each vertical row of battery cells 208 (e.g., rows 1-8, etc.) may connect to the second battery module busbar 220B at the second terminal side 530B of the battery module 108 (e.g., via a second edge row interconnection busbar 534B including one or more legs attached to the second battery module busbar 220B). Although shown in FIG. 5A as including ten horizontal rows of battery cells 208 (e.g., represented by letters A-J) and approximately eight vertical rows of battery cells 208 (e.g., represented by numbers 1-8, etc.) it is an aspect of the present disclosure that the battery module 108 may include more or fewer vertical and/or horizontal rows of battery cells 208 than those illustrated in FIG. 5A.

The cell-to-cell electrical interconnections 216 may comprise a number of separate cell-to-cell interconnections that, when attached to the battery cells 208 in the battery module 108, form a battery cell array electrical interconnection. As provided above, the cell-to-cell electrical interconnections 216 may include a first edge row interconnection busbar 534A configured to connect a same terminal (e.g., polarity) of each battery cell 208 in the first horizontal row, row A, of the battery module 108 to the first battery module, tapered, busbar 220A. In some embodiments, the first edge row interconnection busbar 534A may include an electrically-conductive member extending along the first terminal edge of the battery module 108. The electrically-conductive member may include a substantially planar strip disposed in a plane parallel to the first terminals of the battery cells 208 in the battery module 108. The electrically-conductive member may include a plurality of positive terminal contact fingers extending in the parallel plane in a direction away from the substantially planar strip (e.g., from the first busbar 220A toward the first horizontal row of battery cells, row A). In one embodiment, the electrically-conductive member may include a plurality of busbar legs spaced apart from one another and extending in a second plane substantially orthogonal to the plane of the first terminals, and/or parallel to a side of the battery module 108 or busbar 220A. Each of the plurality of busbar legs may be welded, or otherwise affixed, to the first busbar 220A forming an electrically-conductive path between the battery cells 208 and the first busbar 220A.

Additionally or alternatively, the cell-to-cell electrical interconnections 216 may include a second edge row interconnection busbar 534B configured to connect an opposite same terminal (e.g., opposite polarity) of each battery cell 208 in the last horizontal row, J, of the battery module 108 to the second battery module, tapered, busbar 220B. In some embodiments, the second edge row interconnection busbar 534B may include an electrically-conductive member extending along the second terminal edge of the battery module 108. One or more portions of the second edge row interconnection busbar 534B may be configured as a mirror image, or corresponding opposite, of one or more portions of the first edge row interconnection busbar 534A. For example, the electrically-conductive member of the second edge row interconnection busbar 534B may similarly include a substantially planar strip disposed in a plane parallel to the first terminals of the battery cells 208 in the battery module 108. This electrically-conductive member may include a plurality of negative terminal contact fingers extending in the parallel plane in a direction away from the substantially planar strip (e.g., from the second busbar 220B toward the last horizontal row of battery cells, row J). In one embodiment, the electrically-conductive member may similarly include a plurality of busbar legs spaced apart from one another and extending in a second plane substantially orthogonal to the plane of the first terminals, and/or parallel to a side of the battery module 108 or second busbar 220B. Each of the plurality of busbar legs may be welded, or otherwise affixed, to the second busbar 220B forming an electrically-conductive path between the battery cells 208 and the second busbar 220B.

In some embodiments, the cell-to-cell electrical interconnections 216 may include a number of internal, or battery cell group interconnection, busbars 504A-D. While one or more of the internal busbars 504A-D may be configured in a number of different shapes, it should be appreciated that each of the internal busbars 504A-D may share a common set of features and/or shapes providing series and parallel interconnections between one or more groups of battery cells 208 in the battery module 108. For instance, each internal busbar 504A-D may comprise an electrically-conductive strip extending along a length, LB, or an approximate length of the battery module 108 in a first plane (e.g., a plane parallel to a same terminal of all battery cells 208 in the battery module 108, etc.). The electrically-conductive strip may include a plurality of first terminal strips 512A, 512B, etc. integrally formed from the electrically-conductive strip and extending in a first direction (e.g., in the Y-axis negative direction) away from the electrically-conductive strip in the first plane (e.g., toward a first terminal for battery cells 208 in a single horizontal row, e.g., B-J, etc.). In one embodiment, each of the first terminal strips 512B, 512C, etc. may be spaced apart from one another along the length of the battery module 108 and/or the electrically-conductive strip. Additionally or alternatively, the electrically-conductive strip for each internal busbar 504A-D may include a plurality of second terminal strips 516A, 516B, etc. integrally formed from the electrically-conductive strip and extending in a second direction (e.g., in the Y-axis positive direction) away from the electrically-conductive strip in the first plane (e.g., toward the second terminal for battery cells 208 in another, different, single horizontal row, e.g., A-I, etc.). The plurality of second terminal strips 516A, 516B, etc. may be spaced apart from one another along the length, LB, of the battery module 108 and/or the electrically-conductive strip. In any event, the first and second terminal strips 512B, 512C, etc., 516A, 516B, etc., may be made from an electrically-conductive material forming an electrically-conductive path running from each of the plurality of first terminal strips 512B, 512C, etc. through the electrically-conductive strip to each of the plurality of second terminal strips 516A, 516B, etc.

As shown in the detail view of FIG. 5B, the first edge row interconnection busbar 534A may include a number of first terminal strips 512A disposed along the length of the busbar 534A. These first terminal strips 512A may contact the first terminal (e.g., the positive terminal) of each battery cell 208 in the first row, row A, of the battery module 108. Additionally, and as described herein, the first edge row interconnection busbar 534A may contact the first busbar 220A (e.g., the positive high voltage busbar) forming an electrically-conductive path between the first terminals of the battery cells 208 in the battery module 108 and the first busbar 220A.

Continuing along the Y-axis negative direction, the cell-to-cell electrical interconnections 216 include a first internal busbar 504 having an electrically-conductive strip extending along the X-axis positive direction. The first internal busbar 504 may include a first terminal strip 512B extending from an approximate center of the electrically-conductive strip to the second horizontal row, row B, of battery cells 208 in the battery module 108. These first terminal strips 512B of the first internal busbar 504A may contact the first terminal (e.g., the positive terminal) of each battery cell 208 in the second row, row B, of the battery module 108. In addition, the first internal busbar 504 may include a second terminal strip 512B extending from an approximate center of the electrically-conductive strip to the first horizontal row, row A, of battery cells 208 in the battery module 108. These second terminal strips 512B of the first internal busbar 504A may contact the second terminal (e.g., the negative terminal) of each battery cell 208 in the first row, row A, of the battery module 108. As can be appreciated, a number of electrically-conductive paths are formed from the first busbar 220A through the first edge row interconnection busbar 534A to the first horizontal row, row A, and the second horizontal row, row B, of battery cells 208 in the battery module. The electrically-conductive paths may continue as additional internal busbars 504A-D, in various combinations, join additional groups of battery cells 208 together in the battery module 108.

The internal busbars 504A-D may be disposed in the same plane between the first and second edge row interconnection busbars 534A, 534B of the battery module 108. As shown in FIG. 5A, some internal busbars 504A-D may be the same as others based on an orientation, shape, and/or arrangement of the first and second terminal strips 512, 516 along a length of the battery module 108. By way of example, the second internal busbar 504B, coupling battery cells 208 from a pair of horizontal rows, rows B-C, together, has a substantially similar, if not identical, arrangement of first and second terminal strips 512, 516 to those of the second internal busbar 504B coupling battery cells from other pairs of horizontal rows (e.g., rows D-E, rows F-G, and rows H-I) together, respectively. The same may apply to the third internal busbar 504C, coupling battery cells 208 from pairs of horizontal rows, rows C-D, rows E-F, rows G-H, together.

At the second terminal side 530B of the battery module 108, shown in FIG. 5A, the second edge row interconnection busbar 534B may include a number of second terminal strips 516 disposed along the length of the second busbar 534B. These second terminal strips 516 may contact the second terminal (e.g., the negative terminal) of each battery cell 208 in the last row, row J, of the battery module 108. Additionally, and as described herein, the second edge row interconnection busbar 534B may contact the second busbar 220B (e.g., the negative high voltage busbar) forming an electrically-conductive path between the second terminals of the battery cells 208 in the battery module 108 and the second busbar 220B.

It is an aspect of the present disclosure that first and second terminal strips 512, 516 associated with a first vertical row (e.g., series-connected row) of battery cells 208 (e.g., one of rows 1-8, etc.) may be spaced apart from immediately adjacent first and second terminal strips 512, 516 associated with a second vertical row (e.g., series-connected row) of battery cells 208 (e.g., an adjacent row to the one of rows 1-8, etc.) by an electrically-conductive bridge 520 formed in the electrically-conductive strip of the internal busbar 504. For instance, first and second terminal strips 512B, 516A associated with the first vertical row, row 1, may be spaced apart from the immediately adjacent first and second terminal strips 512B, 516A associated with the second vertical row, row 2, by the electrically-conductive bridge 520A formed in the electrically-conductive strip of the first internal busbar 504A. In some embodiments, the electrically-conductive bridge 520 may be arranged along a path to create one or more feature spaces 528. For example, the electrically-conductive bridge 520 may divert and/or direct around fasteners 532 and/or other feature spaces 528 to provide access and/or electrical insulation between components in the battery module 108. Although arranged to provide the one or more feature spaces 528 by following a path around an element, or area, it should be appreciated, that the electrically-conductive bridge 520 remains substantially flat and in the same plane as the electrically-conductive strip and/or portions of the first and second terminal strips 512, 516.

In some embodiments, a plurality of battery module mount holes 524 may be disposed in the one or more cell-to-cell electrical interconnections 216. For example, the mount holes 524 may be configured as through holes passing through a thickness of the busbars 534A, 534B, 504A-D, etc. and arranged along a length of each busbar 534A, 534B, 504A-D, etc. In some cases, the mount holes 524 may be spaced according to a spacing of the battery cells 208 in the battery module 108. In one embodiment, the mount holes 524 may match a fixed spacing of a series of mount features (e.g., protrusions, etc.) disposed in the housing 212 of the battery module 108. In any event, the mount holes 524 may be configured to align with and/or engage with these mount features to orient the various busbars 534A, 534B, 504A-D, etc. relative to the battery cells 208, the housing 212, and/or one or more other portions of the battery module 108.

Figure 6:
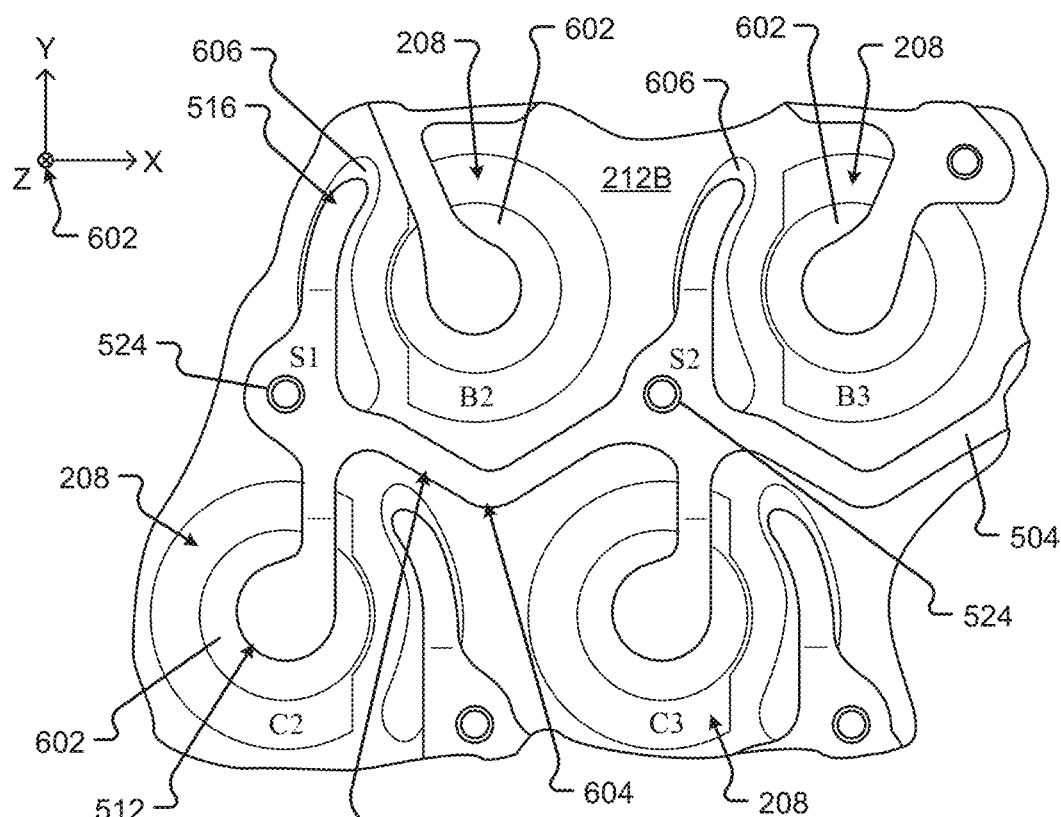
FIG. 6 shows a detail broken plan view of the battery module and cell-to-cell electrical interconnections in accordance with embodiments of the present disclosure.
Figure 13:
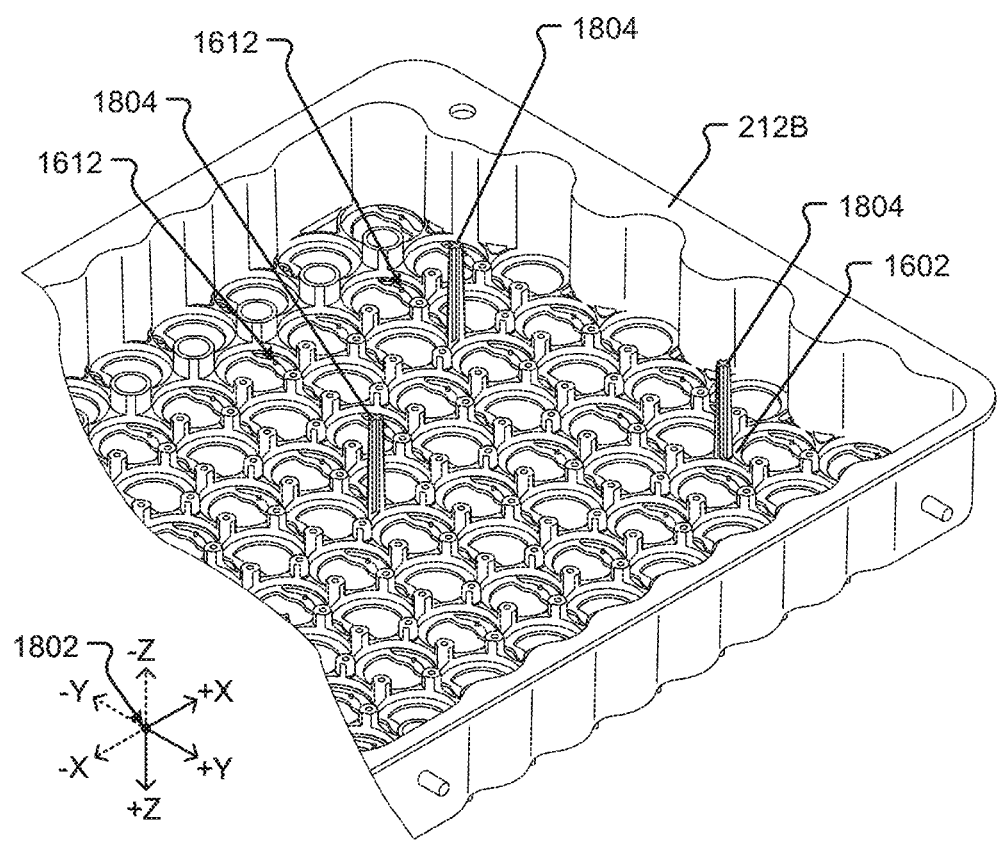
FIG. 13 shows a detail perspective view of a receiving cavity of the battery module cover of FIG. 12.

FIG. 6 shows a detail broken plan view of the battery module 108 and cell-to-cell electrical interconnections 216 in accordance with embodiments of the present disclosure. More specifically, FIG. 6 shows a detail view of an internal busbar 504 of the cell-to-cell electrical interconnections 216 and a controlled expansion feature 604 of the electrically-conductive bridge 520. In some embodiments, the internal busbar 504 shown in FIG. 13 may correspond to any busbar 534A, 534B, 504A-D, etc. in the cell-to-cell electrical interconnections 216 described herein. In one embodiment, the internal busbar 504 shown in FIG. 13 may correspond to the second internal busbar 504B as described above. In any event, FIG. 13 shows a number, or group, of battery cells 208 arranged immediately adjacent to one another in the battery module 108. Each battery cell 208 in the group of battery cells 208 shown in FIG. 13 is labeled with a battery cell identifier (e.g., B2, B3, C2, and C3). Each battery cell 208 may include a first terminal contact substrate 602, or cap (e.g., corresponding to the positive terminal of the battery cell 208) and a second terminal contact substrate 606, or casing (e.g., corresponding to the negative terminal of the battery cell 208). All of the battery cells 208 in the battery module 108 are shown having the first terminals (e.g., positive terminals) facing the same direction. The internal busbar 504 includes a first terminal strip 512 in contact with, or welded to, the first terminal contact substrate 602 of battery cell, C2, and a second terminal strip 516 in contact with, or welded to, the second terminal contact substrate 606 of battery cell, B2, joining the battery cells B2-C2 in series.

The internal busbar 504 may be attached to the housing 212, or upper housing 212B, of the battery module 108 via a number of static mount features S1, S2 disposed along a portion of the upper housing 212B. The static mount features S1, S2 may define fixed points and/or protrusions extending a distance from an upper surface of the upper housing 212B (e.g., out of the page, along the Z-axis direction) and along a length of the battery module 108. The mount holes 524 of the internal busbar 504 may align and engage with these static mount features S1, S2 and as the internal busbar 504 is lowered onto the features S1, S2, a substantially planar surface of the electrically-conductive strip of the busbar 504 may contact the upper surface of the upper housing 212B when in place. As the battery module 108 generates heat, or is subjected to heat, the distance between the fixed static mount features S1, S2 may change at a different rate than the distance between the battery cells 208 and/or the corresponding mount holes 524 on the internal busbar 504. This difference in rate of change in dimension may be related to different coefficients of thermal expansion associated with the materials making up the housing 212 and/or the internal busbar 504. The present disclosure provides a controlled expansion feature 604 allowing for these differences in coefficients of thermal expansion and/or tolerance issues associated with the position of the static mount features S1, S2.

For example, the controlled expansion feature 604 may be formed in the in the same plane integrally with the electrically-conductive strip. In some embodiments, the controlled expansion feature 604 may be disposed between immediately adjacent terminal strips 512, 516 in the spaced apart terminal strips 512, 516 along the length of the battery module 108. As the dimension between the static mount features S1, S2 shrinks or grows (e.g., due to cold or hot temperatures, respectively) the controlled expansion feature 604, configured as a knee in the electrically-conductive strip, may move in the same plane (e.g., the XY-plane) of the electrically-conductive strip and along the Y-axis direction compensating for the dimensional change. In one embodiment, the controlled expansion feature 604 may be substantially V-shaped and/or U-shaped in an area between the static mount features S1, S2. It is an aspect of the present disclosure that the controlled expansion feature 604 may move in the XY-plane without moving out of the XY-plane. For example, the substantially planar electrically-conductive bridge 520 and the electrically-conductive strip may remain in contact with the upper surface of the upper housing 212B, even when moving to compensate for differences in coefficients of thermal expansion.

Additionally or alternatively, the controlled expansion feature 604 of the internal busbar 504 may provide a tolerance aid when assembling the internal busbar 504 to the upper housing 212B. For instance, the controlled expansion feature 604 may act as a substantially planar spring between terminal strips 512, 516 and/or mount holes 524 of the internal busbar 504. This spring feature built into the controlled expansion feature 604 may allow the internal busbar 504 to be stretched, or contracted, along its length during assembly and/or placement.

Figure 7:
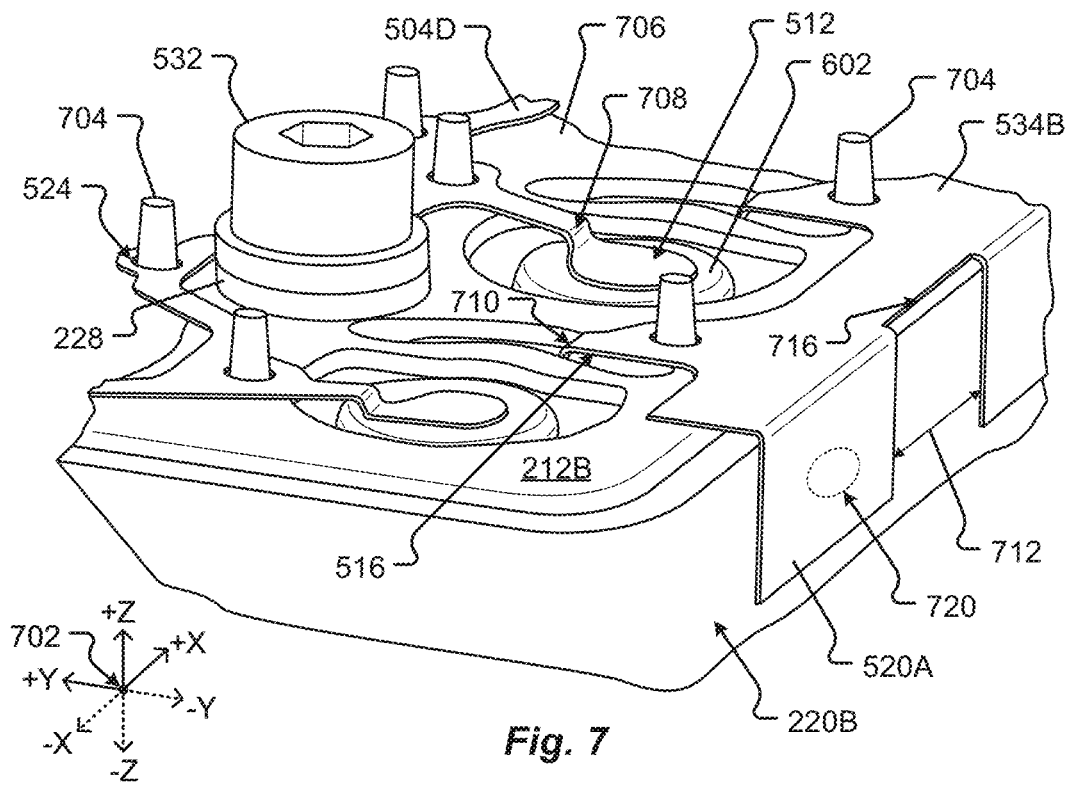
FIG. 7 shows a detail perspective view of the battery module and cell-to-cell electrical interconnections in accordance with embodiments of the present disclosure.

FIG. 7 shows a detail perspective view of the battery module 108 and a portion of the cell-to-cell electrical interconnections 216 in accordance with embodiments of the present disclosure. In particular, the perspective view shows a detail of the bent portions of the first and second terminal strips 512, 516 associated with the various busbars 534A, 534B, 504A-D, etc., as described herein. For example, each terminal strip 512, 516 may include a bend region 708, 710 configured to dispose an end of each terminal strip in a plane offset from and substantially parallel to the upper surface 706 of the upper housing 212B. In one embodiment, these ends may be bent such that the ends of the terminal strips 512, 516 orient a surface of the terminal strip 512, 516 in contact with the terminal contact substrate 602, 606 of a corresponding battery cell 208, respectively.

As shown in FIG. 7, the mount holes 524 of the internal busbar 504D and the second edge row interconnection busbar 534B are engaged with mount features 704 of the upper housing 212B. The busbars 504D, 534B are shown with a substantially planar surface in contact with the upper surface 706 of the upper housing 212B. The first terminal strips 512, associated with the internal busbar 504D, are shown bent at the first bend region 708 such that the end of the first terminal strips 512 are shown extending from the upper surface 706 of the upper housing 212B toward the first terminal contact substrate 602 of the battery cells 208 (e.g., disposed under the upper surface 706 of the upper housing 212B by a distance in the Z-axis negative direction). The end of the first terminal strips 512 may contact the first terminal contact substrate 602 of the battery cells 208 (e.g., the positive terminal cap) at a first contact pad area (e.g., positive terminal contact pad area of the busbar 504D). The second terminal strips 516, associated with the second edge row interconnection busbar 534B, are shown bent at the second bend region 710 such that the end of the second terminal strips 516 are shown extending from the upper surface 706 of the upper housing 212B toward the second terminal contact substrate 606 of the battery cells 208 (e.g., disposed under the upper surface 706 of the upper housing 212B by a distance in the Z-axis negative direction). The end of the second terminal strips 516 may contact the second terminal contact substrate 606 of the battery cells 208 (e.g., the negative terminal cap) at a second contact pad area (e.g., negative terminal contact pad area of the busbar 504D). In some embodiments, the first and second terminal contact substrates 602, 606 may be disposed in parallel and offset planes, both facing the same direction and under the upper surface 706 of the upper housing 212B.

Although described in conjunction with the first terminal strips 512 of an internal busbar 504D and the second terminal strips 516 of the second edge row interconnection busbar 534B, it should be appreciated that the same, or substantially similar features, may be associated with the first terminal strips 512 of the first edge row interconnection busbar 534A, the second terminal strips 516 of the internal busbars 504, and/or any combination thereof. For example, the internal busbars 504A-D may include first and second terminal strips 512, 516 having the same, or substantially similar, first and second bend regions 708, 710 as described in conjunction with the first and second bend regions 708, 710 of the internal busbar 504D and the second edge row interconnection busbar 534B, respectively. Further, the first edge row interconnection busbar 534A may include first and second terminal strips 512, 516 having the same, or substantially similar, first bend region 708 as described in conjunction with the first bend regions 708 of the internal busbar 504D.

Additionally or alternatively, FIG. 7 shows a series of spaced apart electrical interconnection points 1020 associated with the edge row interconnection busbars 534A, 534B, structured as a busbar comb. Although illustrated as part of the second edge row interconnection busbar 534B, it should be appreciated that any description of the spaced apart electrical interconnection points 1020 with respect to the second edge row interconnection busbar 534B may be apply to the first edge row interconnection busbar 534A. For instance, similar, if not identical, features may be found on each of the edge row interconnection busbars 534A, 534B.

In some embodiments, the edge row interconnection busbars 534A, 534B may include a plurality of spaced apart electrical interconnection points 1020 formed in the busbars 534A, 534B and extending in a plane substantially orthogonal to the upper surface 706 of the upper housing 212B. The spaced apart electrical interconnection points 1020 may be referred to herein as "busbar legs." The busbar legs 1020 may be formed in a substantially planar sheet of electrically conductive material making up the edge row interconnection busbars 534A, 534B. These busbar legs 1020 may be bent substantially orthogonal to a surface (e.g., the upper surface 706 of the upper housing 212B) of the battery module 108 to connect to a high voltage busbar 220A, 220B disposed along a length and side of the battery module 108. In one embodiment, each of the busbar legs 1020 (e.g., immediately adjacent to one another) may be spaced apart from one another along a length of the edge row interconnection busbars 534A, 534B and/or the battery module 108 by a separation distance 712. In one embodiment, the separation distance 712 may be defined by a cut in the substantially planar sheet of electrically conductive material making up the edge row interconnection busbars 534A, 534B. The cut may include a relief area 716 disposed at or before the substantially orthogonal bend in the edge row interconnection busbars 534A, 534B. This relief area 716 may allow each of the busbar legs 1020 to extend over a portion of a high voltage busbar 220A, 220B and, until affixed to the high voltage busbar 220A, 220B, remain flexible and independently movable relative to one another. Among other things, this unique arrangement of busbar legs 1020 allows the individual busbar legs 1020 to be attached, welded, or otherwise affixed to a busbar 220A, 220B at a connection area 720 without building up stress along the length of the edge row interconnection busbars 534A, 534B.

Figure 8:
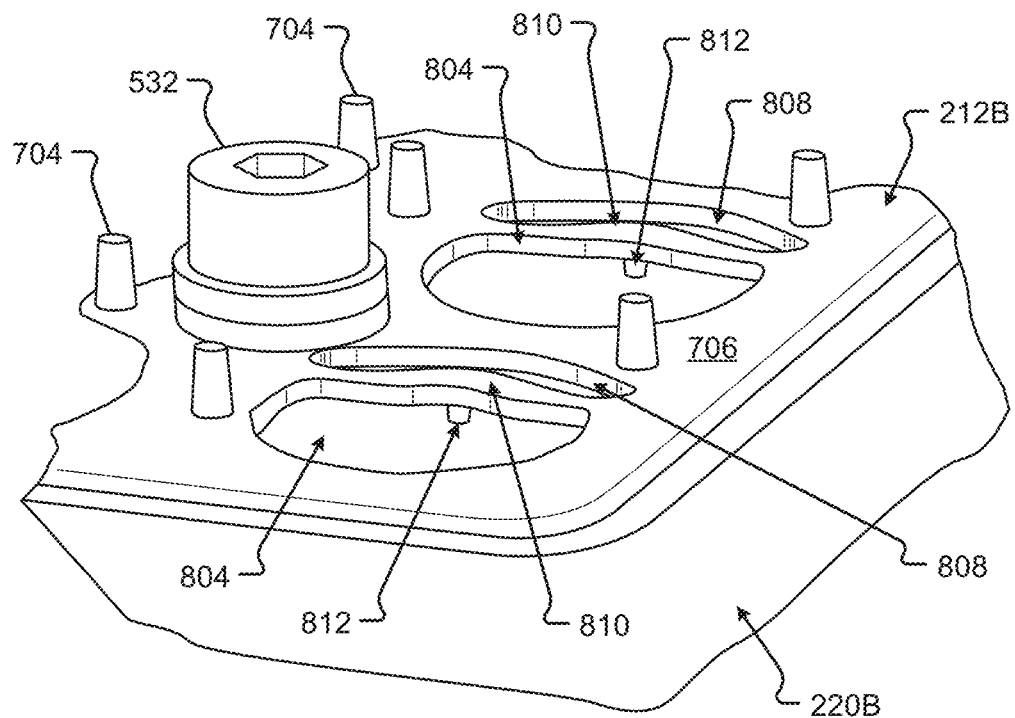
FIG. 8 shows a detail perspective view of a battery module cover terminal access receptacles in accordance with embodiments of the present disclosure.
Figure 9:
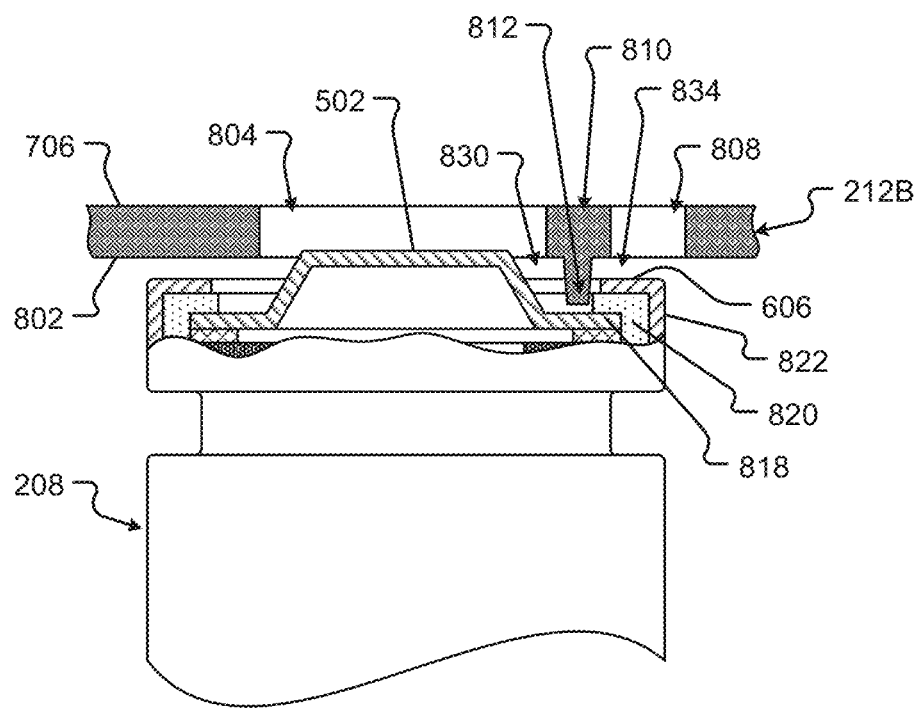
FIG. 9 shows a detail broken section view of a battery cell and portion of the battery module cover including a terminal isolation feature in accordance with embodiments of the present disclosure.

FIGS. 8 and 9 show various views of a battery module upper housing, or cover 212B, having a number of battery cell terminal access apertures or receptacles 804, 808 disposed therethrough. The cover 212B may be configured as a substantially planar member extending along the length and width of the battery module 108. The cover 212B may include a first surface 706 and a substantially parallel second surface 802 separated a distance by a thickness of the substantially planar member. Each of the terminal access receptacles 804, 808 may be associated with a particular battery cell 208 and/or battery cell location in the array of battery cells 208 in the battery module 108. In particular, the terminal access receptacles 804, 808 may provide a clear opening in the cover 212B from the first surface 706 to a corresponding battery cell contact surface 602, 606. For instance, the first terminal access receptacle 804 may provide an unobstructed opening from the first surface 706, through the cover 212B, to the first terminal contact surface 602 of the battery cell 208. Continuing this example, the second terminal access receptacle 808 may provide an unobstructed opening from the first surface 706, through the cover 212B, to the second terminal contact surface 606 of the battery cell 208.

Figure 16A:
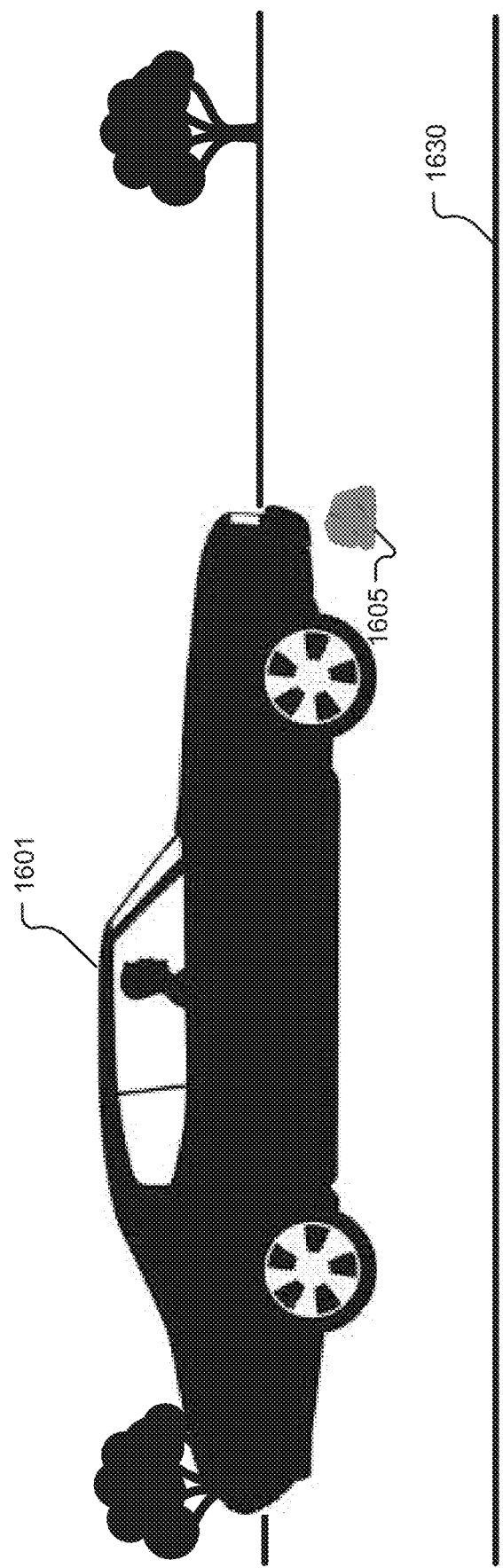
FIGS. 16A-16B show a crash event in accordance with at least some embodiments of the present disclosure.

The terminal access receptacles 804, 808 may be shaped to conform to a portion of the battery cell 208 in the array of battery cells 208 in the battery module 108. As shown in FIG. 16A, the first terminal access receptacle 804 is configured as a hole or aperture having a substantially D-shaped perimeter, while the second terminal access receptacle 808 is configured as a hole or aperture having a substantially C-shaped, or arcuate, perimeter. Although shown as having a particular perimeter shape, it should be appreciated that the perimeter of either terminal access receptacle 804, 808 may include any shape that provides access for a terminal connection portion of a cell-to-cell interconnection busbar (e.g., busbars 504, 534A, 534B, etc.).

In some embodiments, the first terminal access receptacle 804 may be disposed adjacent to the second terminal access receptacle 808 for a single battery cell 208 in the array of battery cells 208 with a bridging portion 810 of material (e.g., of the cover 212B) disposed between the first and second terminal access receptacles 804, 808 for the single battery cell 208. The bridging portion 810 may serve as a physical separator between terminal connection portions of one or more battery cell busbars 504, 534A, 534B, etc., in the battery module 108. In one embodiment, the bridging portion 810 may isolate the terminal connection portions of one or more battery cell busbars 504, 534A, 534B, etc. from moving out of position relative to a particular battery cell contact surface 602, 606. The bridging portion 810 may prevent electrical shorting by having a single conductive portion of material associated with a terminal connection portion from simultaneously contacting both positive and negative terminals of the battery cell 208.

Figure 16B:
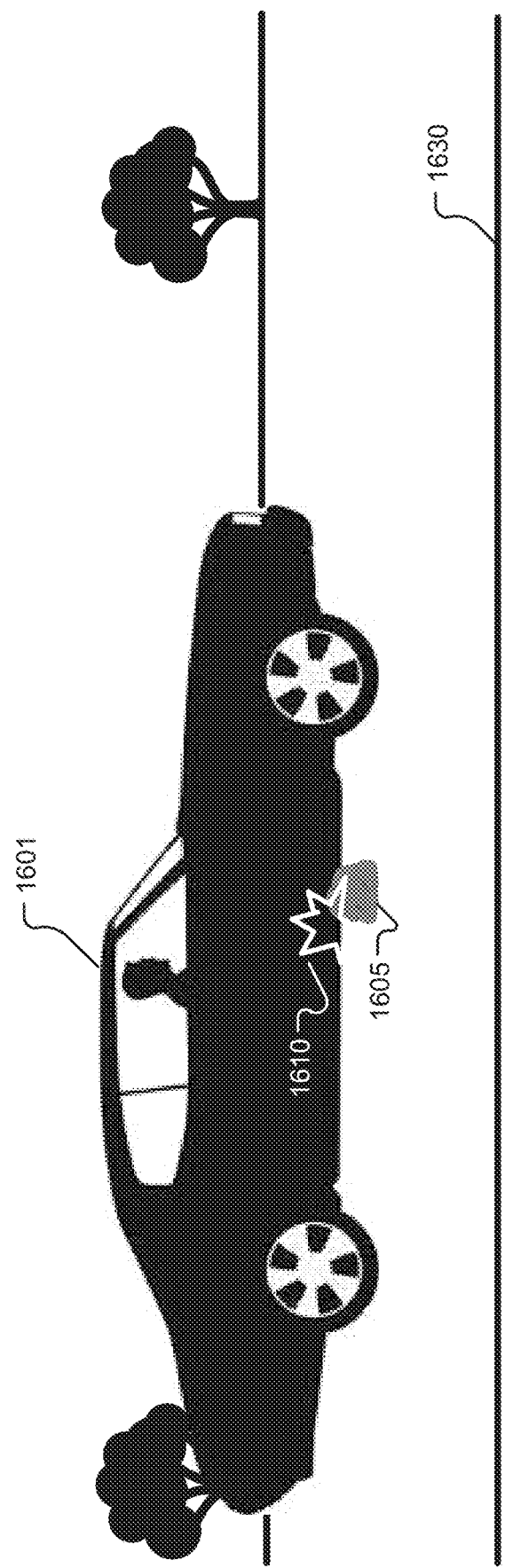

The bridging portion 810 and/or some other portion of the cover 212B may include a terminal isolation feature, or protrusion, 812 extending from the second surface 802 of the cover 212B in a direction (e.g., away from the first surface 706) toward a battery cell 208 in the array of battery cells 208. As shown in FIG. 16B, each battery cell 208 in the array of battery cells 208 may include a casing 822, a first terminal or cap 818, and an electrical insulation gasket 820 disposed between the first terminal 818 and the casing 822. In some embodiments, the first terminal 818 may correspond to the positive terminal of the battery cell 208 and the casing 822 may correspond to the second, or negative, terminal of the battery cell 208. As described above, each battery cell 208 in the battery module 108 may include a first battery cell contact area or surface 602 (e.g., the positive contact surface) and a second battery cell contact area or surface 606 (e.g., the negative contact surface). The first battery cell contact surface 602 may be configured to contact a first terminal strip 512 of one or more of the battery cell busbars 504, 534A, 534B, etc. and the second battery cell contact surface 602 may be configured to contact a second terminal strip 516 of one or more of the other battery cell busbars 504, 534A, 534B, etc. In some embodiments, the terminal strips 512, 516 may be welded to respective battery cell contact surfaces 602, 606 (e.g., electrically and mechanically coupling the battery cells 208 to the cell-to-cell busbars 504, 534A, 534B, etc. and even the high voltage busbars 220A, 220B.

It is an aspect of the present disclosure that each of the terminal isolation features 812 may be aligned in an area 830 between the first terminal 818 and the second terminal 822 of each battery cell 208. In one embodiment, the cover 212B may be placed over an arranged array of battery cells 208 allowing the terminal isolation features 812 to nest, or positively locate, in the area 830 of the battery cells 208. Additionally or alternatively, the terminal isolation feature 812 may block a path (e.g., along which a disconnected terminal strip 512, 516 may move, etc.) from an area 834, at the second battery cell contact surface 606 (e.g., of the second terminal 822), to the area 830 adjacent to the first battery cell contact surface 602 (e.g., of the first terminal 818). For example, the terminal isolation feature 812 may extend from the second surface 802 of the cover 212B past the second battery cell contact surface 606 providing a "wall" or a portion (e.g., a pin, protrusion, truncated cone, etc.) of dielectric material disposed between a terminal connector (e.g., terminal strip 516) attached to the second battery cell contact surface 606 and the first terminal 818, and/or the terminal connector (e.g., terminal strip 512) attached to the first battery cell contact surface 602.

Figure 11:
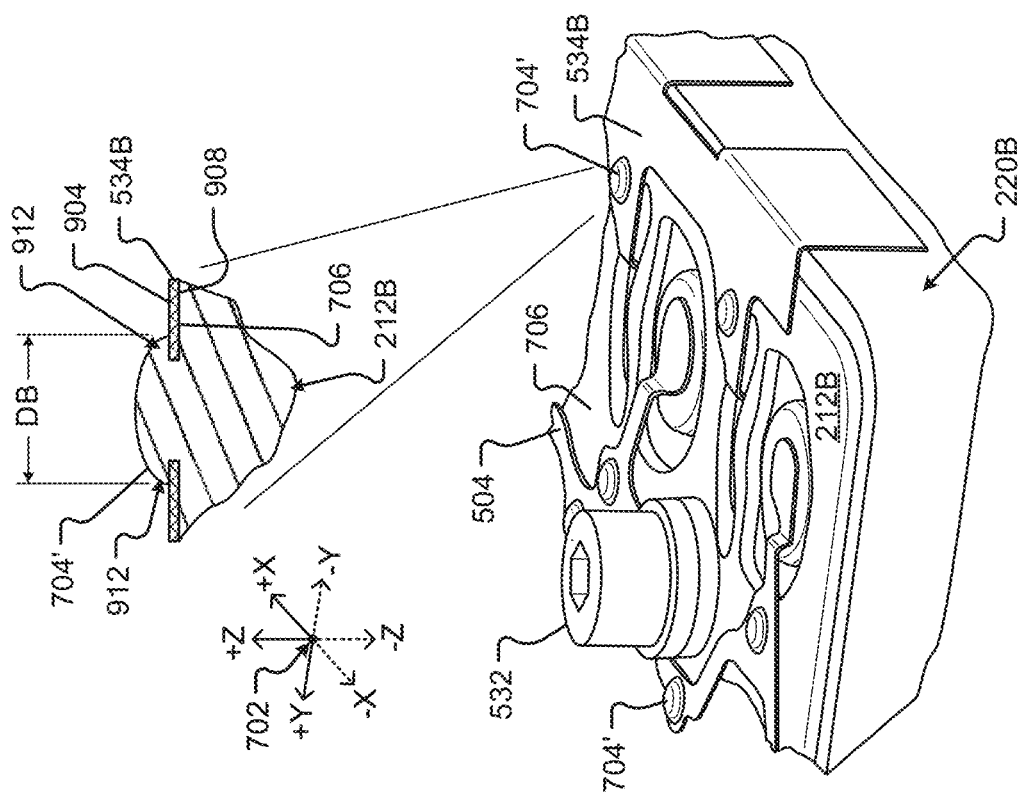
FIG. 11 shows a detail perspective view of the battery module and cell-to-cell electrical interconnection mount posts in a second state in accordance with embodiments of the present disclosure.
Figure 10:
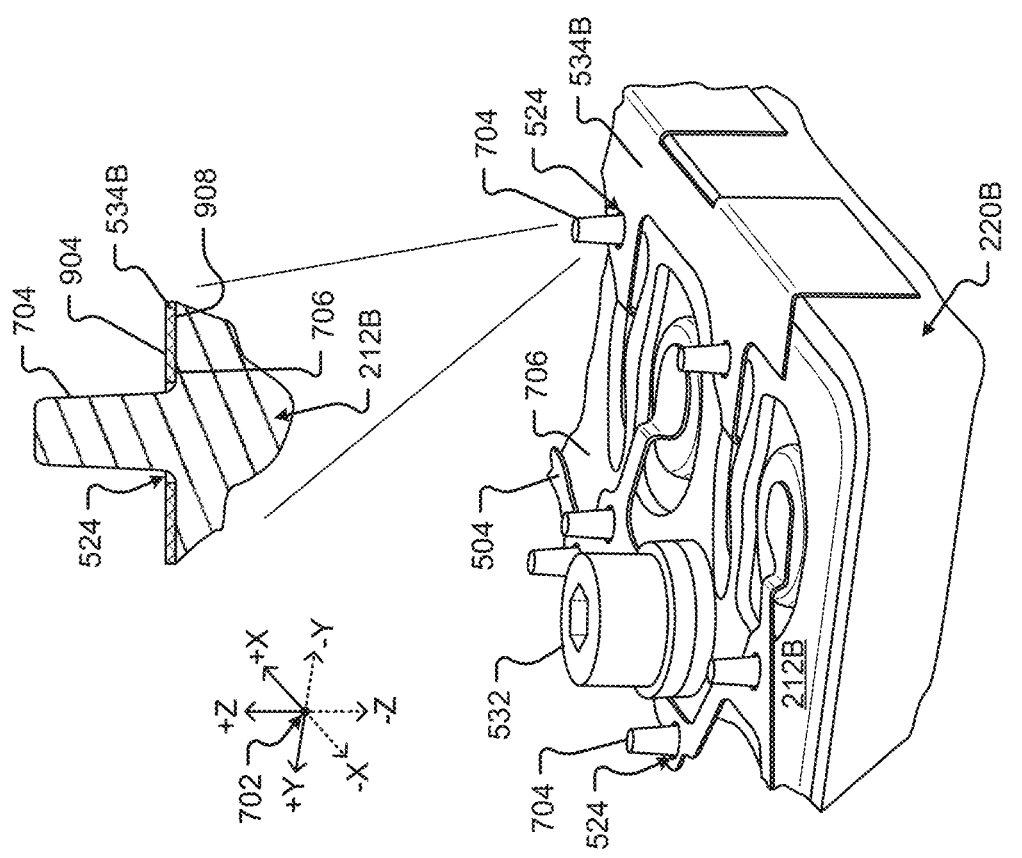
FIG. 10 shows a detail perspective view of the battery module and cell-to-cell electrical interconnection mount posts in a first state in accordance with embodiments of the present disclosure.

FIGS. 10 and 11 show detail perspective views of the battery module 108 and cell-to-cell electrical interconnection mount features, or posts, 704 in different assembly states in accordance with embodiments of the present disclosure. The mount posts 704 may be configured as a number of protrusions extending from the first surface 706 of the cover 212B in a direction away from the second surface 802. In some embodiments, the mount posts 704 may be configured as truncated cones, tapered protrusions, and/or integrally formed portions of the cover 212B. In one embodiment, the mount posts 704 may be tapered in accordance with a draft angle associated with a mold for the cover. In any event, where the mount posts 704 are tapered, the mount posts may taper from a first diameter at the first surface 706 of the cover 212B to a smaller second diameter at a distance offset from the first surface in the Z-axis positive direction (e.g., in a direction away from the second surface 802).

Among other things, the tapered mount posts 704 may serve as alignment pins to receive, and positively locate or orient, one or more of the cell-to-cell busbars 504, 534A, 534B. For instance, the mount posts 704 may engage with one or more mount holes 524 disposed in the cell-to-cell busbars 504, 534A, 534B. Once positioned, a substantially planar resting surface 908 of the cell-to-cell busbars 504, 534A, 534B may contact, and rest on, the first surface 706 of the cover 212B. In this "resting" position, each of the terminal strips 512, 516 (e.g., the bent contact ends) associated with the oriented cell-to-cell busbars 504, 534A, 534B may be disposed over or at least partially within the appropriate, or corresponding, terminal access receptacles 804, 808 of the cover 212B.

Figure 12:
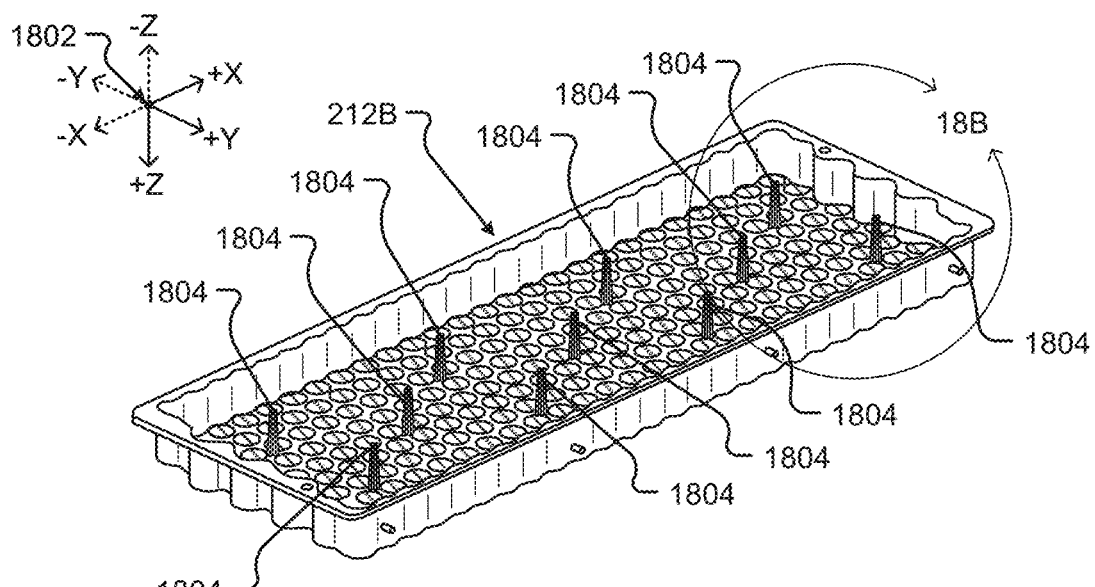
FIG. 12 shows a schematic perspective view of a receiving cavity of a battery module cover including retaining protrusions shows in accordance with embodiments of the present disclosure.

Referring to FIGS. 12 and 13, various perspective view of a receiving cavity of a battery module cover 212B including retaining protrusions 1804 are shown in accordance with embodiments of the present disclosure. In some embodiments, the inside of the cover 212B may include one or more features similar, if not identical, to the battery cell location frame 900 described in conjunction with FIGS. 10 and 11. In any event, the cover 212B may comprise a substantially planar substrate extending a length, LB, and a width of the battery module 108. The substantially planar substrate may include a number of walls (e.g., sidewalls) disposed at the periphery of the substrate and extending substantially orthogonal to the substantially planar substrate. The sidewalls and substantially planar substrate may define the volume corresponding to the battery cell containment cavity.

In some embodiments, the cover 212B may include a number of retaining protrusions 1804, or features, that extend from a surface (e.g., the second surface 802) of the substantially planar substrate into a space between adjacent battery cells 208, or battery cell locations, in the battery module 108. The retaining protrusions 1804 may be integrally formed from the cover 212B (e.g., molded or formed together with one or more other features of the cover 212B, etc.). In one embodiment, the retaining protrusions 1804 may extend a distance, or depth, that substantially matches a height of the cover 212B. In some embodiments, the distance, or depth, of the retaining protrusions 1804 may be less than the height of the cover 212B, while still disposed within the battery retaining cavity of the cover 212B. In any event, the retaining protrusions may provide a number of adhesive contact surfaces configured to provide a structural connection between the cover 212B and lower housing 212A of a battery module 108 via an inserted and cured structural material or adhesive 404. For instance, once the battery module 108 is assembled, the unit may be filled with a structural material 404 (e.g., structural foam, epoxy, etc.) configured to flow between each of the battery cells 208 and the cover 212B making contact with the retaining protrusions 1804. Once the structural material 404 cures, the cured structural material 404 may adhere to the retaining protrusions 1804, the internal surfaces of the cover 212B (e.g., the sidewalls, substantially planar substrate, etc.), and the array of battery cells 208, and the cover 212B may be retained, or held, in place. This connection between the structural material 404 and the cover 212B may add a number of nodes 504 to the force distribution framework as described in conjunction with FIGS. 5A and 5B. For example, the structural material 404 may adhere to one or more portions of the cooling plate 224, the retaining protrusions 1804, the lower housing 212A, the cover 212B, the battery cell location frame 900, and battery cells 208 forming a complete structurally interconnected battery module 108.

The retaining protrusions 1804 may include a number of features (e.g., holes, slots, ribs, webs, textures, or other interrupted surfaces, etc.) configured to foster adhesion between a portion of the structural material 404 inserted into the battery module 108 and at least a portion of the retaining features 1804. As shown in FIG. 18B, one or more of the retaining protrusions 1804 may comprise an X-shaped cross-sectional area tapering from a first cross-sectional area at the second surface 802 to a smaller cross-sectional area at the depth, or length, of the retaining protrusion 1804. The X-shaped cross-section of the retaining protrusion 1804 may provide a greater number of contact surfaces, and increased surface area, for the structural material 404 to contact and/or adhere to. For instance, the X-shaped cross-section may provide approximately twelve contact surfaces that extend the depth, or length, of the retaining protrusion 1804. In some embodiments, the retaining protrusions 1804 may taper in accordance with a draft angle of a mold. For instance, in one embodiment the cover 212B may be manufactured using at least one mold. In this instance, the draft angle for the mold and/or process may correspond to an angle of taper for the retaining protrusions 1804.

Although shown including approximately eleven retaining protrusions 1804, it should be appreciated that the cover 212B may include more or fewer retaining protrusions 1804. The retaining protrusions 1804 may be oriented at battery cell locations of the battery module 108 where immediately adjacent sets of three or more battery cells 208 are disposed. For example, an open space may be disposed between these immediately adjacent sets of battery cells 208 that may be configured to receive one or more of the retaining protrusions 1804. Additionally or alternatively, the retaining protrusions 1804 may be sized to fit within this open space. In any event, the retaining protrusions 1804 may add strength to the battery module 108, reduce the number of components required to assemble the battery module 108, provide a simplified assembly (e.g., requiring no additional fasteners, etc.), providing a lighter weight battery module 108, lower the profile of the battery module 108, and provide a seamless appearance to the battery module 108.

Figure 14:
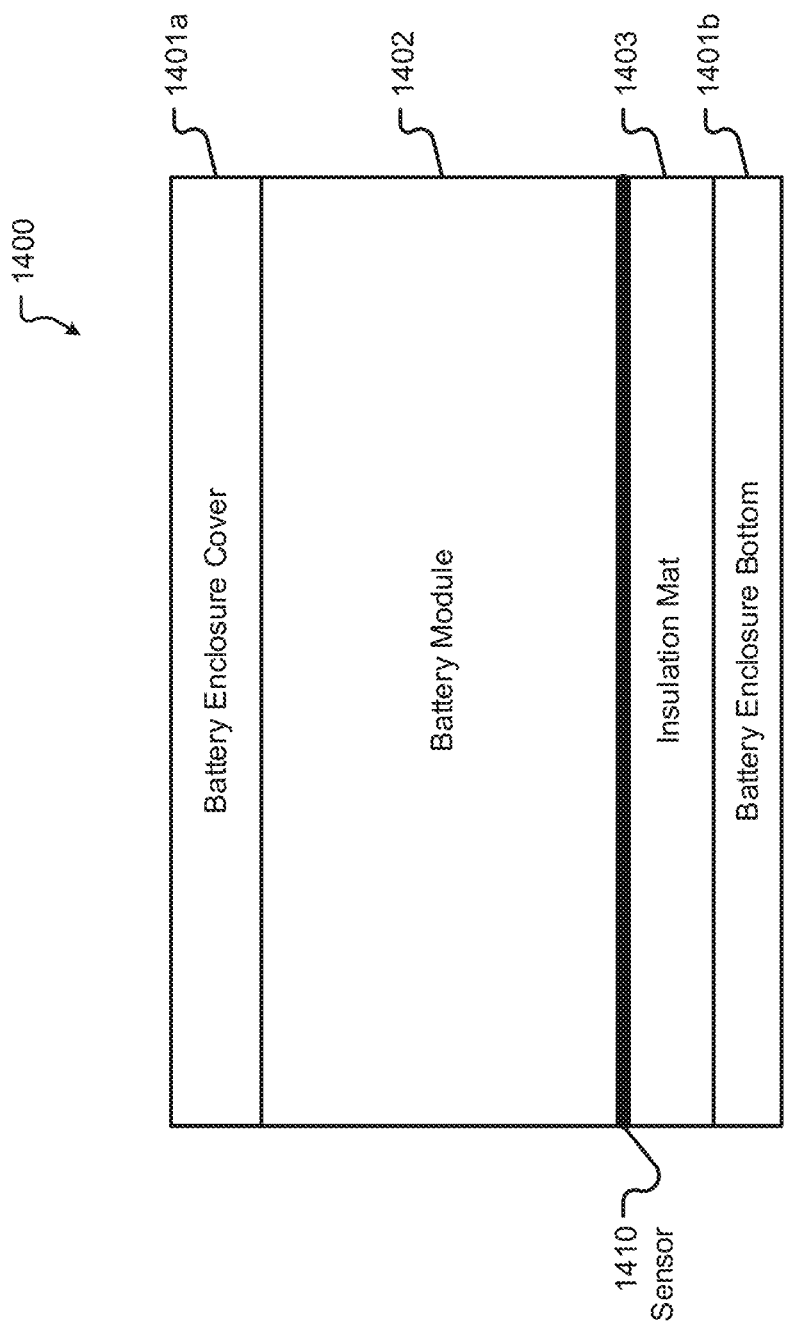
FIG. 14 shows a block diagram of the different layers in a battery enclosure and the placement of the wire mesh in accordance with embodiments of the present disclosure.

Referring now to FIG. 14, a cross section of the different layers of a battery pack enclosure 1400 are illustrated in a block diagram.

The battery pack enclosure 1400 includes a top cover 1401a and a bottom cover 1401b. The battery pack enclosure 1400 includes at least one battery module 1402. On the inside of the battery pack bottom 1401b is an insulation mat. In some embodiments, the insulation mat comprises a Fiberglass Reinforced Plastic (FRP) Insulation mat. The sensor 1410 (e.g., the mesh of resistive wires) is located below the battery module 1402 and on top of the insulation mat 1403. In some embodiments, the mesh of resistive wires is printed on insulation on the inside surface of the battery pack enclosure. For example, the wire mesh may be silk screen printed onto.

Alternatively or in addition, each individual battery module may have a separate mesh of resistive wires (e.g., sensor) to detect damage. The location of the detected damage may be pinpointed by determining which mesh of resistive wires, and thereby which battery module is damaged. For example, a slave module (e.g., mini battery circuit breaker (BCB)) may be mounted on each battery module 108 (e.g., a flex cable from the insulation mat 1403 to the slave module) to monitor resistance and provide individual control.

Figure 15:
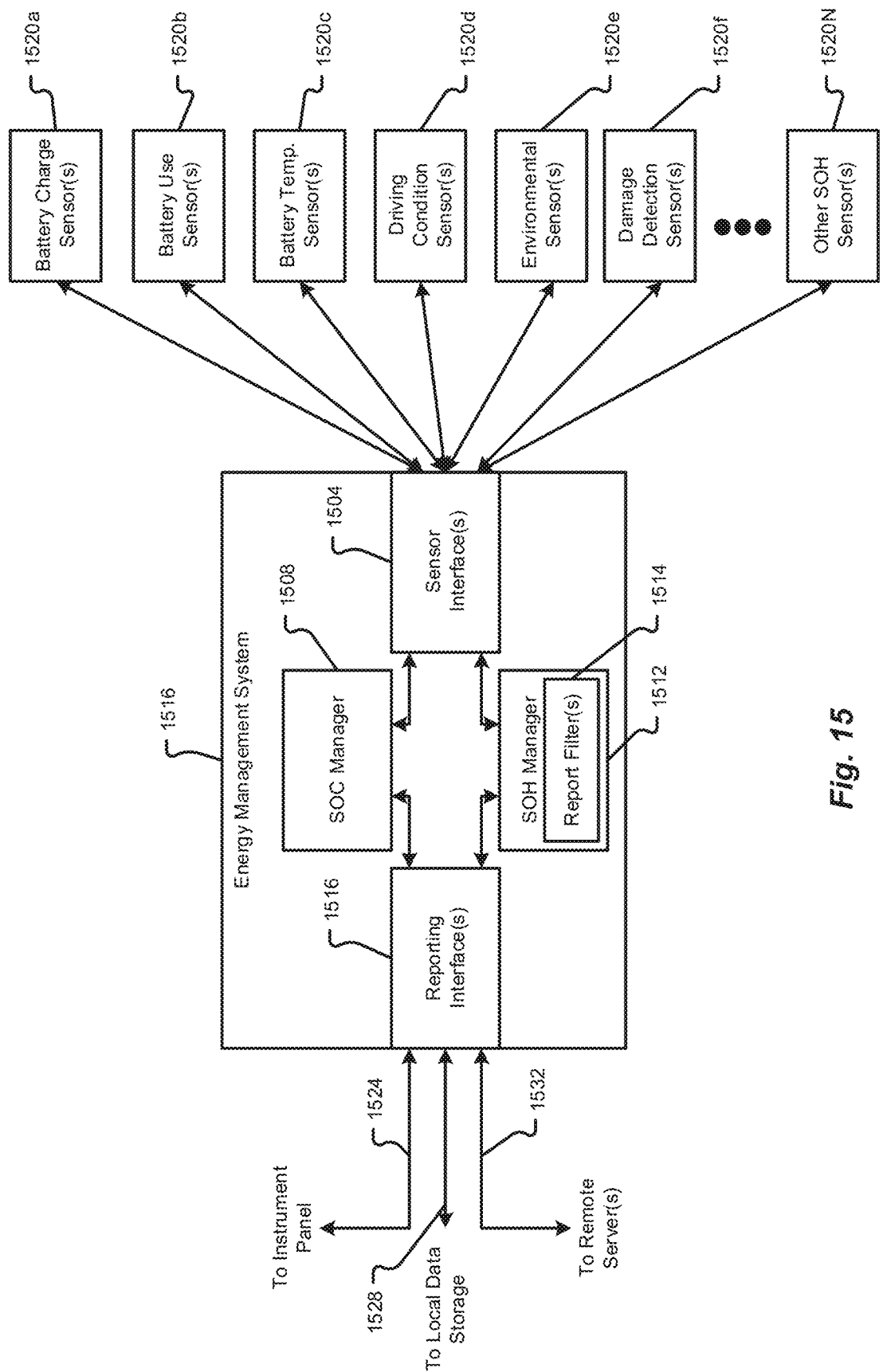
FIG. 15 shows a block diagram of an energy management system in accordance with at least some embodiments of the present disclosure.

Referring now to FIG. 15, additional details of an energy management system 1516 will be described in accordance with at least some embodiments of the present disclosure. The energy management system 1516 is shown to include one or more sensor interfaces 1504, a state of charge (SOC) manager 1508, a state of health (SOH) manager 1512, and one or more reporting interfaces 1516. The sensor interface(s) 1504 enable the energy management system 1504 to receive information from one or more battery state sensors 1520a-N. In particular, different interfaces 1504 may be provided for different sensors, depending upon the nature of the sensor, the format of the sensor input provided to the energy management system 1516, and other factors.

Examples of sensors 1520 that may provide input to the energy management system 1516 include, without limitation, battery charge sensor(s) 1520a, battery use sensor(s) 1520b, battery temperature sensor(s) 1520c, driving condition sensor(s) 1520d, environmental sensor(s) 1520e, damage detection sensor(s) 1520f, and other SOH sensor(s) 1520N. Information may be provided from the sensors to the energy management system 1516 in the form of basic analog or digital signals. Alternatively or additionally, the sensor(s) 1520a-N may provide voltage or current readouts that are converted by the sensor interface(s) 1504 into an appropriate reading or data that represents an SOH condition. The sensor(s) 1520a-N may provide sensor readings to the energy management system 1516 on a continuous, periodic, non-periodic basis. In particular, readings from the sensor(s) may be provided to the energy management system 1516 only in response to certain conditions being met (e.g., a change in measured state occurring) or the readings may be provided continuously without regard for any state change.

In some embodiments, the battery charge sensor(s) 1520a may provide data indicative of a current charge state for a battery, battery cell 208, battery module 108, or any other type of power storage. The battery charge sensor(s) 1520a may be used as a source of information about a current state of a battery. As such, information received from the battery charge sensor(s) 1520a may be used by the SOC manager 1508 to report current charge information for the batteries 208. Alternatively or additionally, the SOC manager 1508 may take the information received from the battery charge sensor(s) 1520*a* and convert that information into reportable information that describes a current state of the battery's charge (e.g., 50% charge remaining, 100% charged, 10% charge, etc.), a remaining range of the vehicle 100 (e.g., 100 miles to empty, 10 km to no charge, etc.), or the like. In some embodiments, the battery charge sensor(s) 1520*a* may include a measurement system or collection of sensors that measure charge or discharge current flowing through a battery, voltage across battery terminals, and/or temperature of the battery itself. As such, the sensor(s) 1520*a* may include one or many transducers that detect physical phenomena (e.g., temperature, current, voltage, etc.) and convert the detected physical phenomena into an output current, voltage, or similar type of electronic signal (which can be digital or analog). The sensor(s) 1520*a* may include one or more shunts or shunt circuits that enable the sensing of battery currents. The sensor(s) 1520*a* may also include one or more integrated processors that detect or determine a battery's SOC.

The battery use sensor(s) 1520*b*, in some embodiments, may correspond to one or more transducers that help determine whether and/or to what extent batteries are being used. It may be possible to incorporate functionality of the battery use sensor(s) 1520*b* into the battery charge sensor(s) 1520*a* as changes in battery charge or SOC may signify that the battery is currently in use or has recently been used. A battery use sensor(s) 1520*b* may help to determine, in a binary fashion, whether a battery is currently connected to a load, for example. A battery use sensor(s) 1520*b* may also detect when a battery is not in use—again in a binary fashion. The battery use sensor(s) 1520*b* may also detect which particular loads in the vehicle 100 are currently drawing power from a battery or set of batteries. In this way, the battery use sensor(s) 1520*b* can help determine the operational loads being placed on batteries in addition to determining whether current is simply being drawn from the batteries. As can be appreciated, the battery use sensor(s) 1520*b* can be incorporated into or nearby loads of the vehicle rather than the batteries themselves. Alternatively or additionally, the battery use sensor(s) 1520*b* may be utilized to determine whether batteries are subjected to fast charges or normal charges. Knowledge of whether a battery is being subjected to a fast charge or normal charge can help to determine or predict future performance of a battery (e.g., excessive fast charges can negatively impact long-term battery performance including overall capacity, ability to maintain a full charge, etc.). Accordingly, as fast charges are detected at the battery use sensor(s) 1520*b*, the SOH manager 1512 may be notified of such information.

The battery temperature sensor(s) 1520*c* may correspond to one or more thermal transducers that measure a physical temperature at or near a battery (or battery cell). The temperatures measured by the sensor(s) 1520*c* may be in Fahrenheit, Celsius, etc. The temperature(s) measured by the sensor(s) 1520*c* may be reported continuously or periodically without departing from the scope of the present disclosure.

The driving condition sensor(s) 1520*d* may include one or many sensors that help detect the way in which a vehicle is being driven (e.g., via manual input, autonomously, semi-autonomously, etc.). The driving condition sensor(s) 1520*d* may also detect routes driven by the vehicle 100, acceleration profiles, deceleration profiles, braking profiles, and the like. The driving condition sensor(s) 1520*d* may include one or more accelerometers, GPS systems, motion sensors, rotation sensors, or the like. In particular, the driving condition sensor(s) 1520*d* may help to collect information that describes how a vehicle 100 is being driven, which can be potentially correlated to battery performance. For instance, aggressive driving (e.g., driving in which significant accelerations and decelerations are performed) may result in degraded performance for a battery over its life due to significant and drastic swings in loads applied to the batteries.

The environmental sensor(s) 1520*e* may include one or many sensors that are used to detect environmental conditions about the vehicle 100 and/or batteries. In particular, humidity, barometric pressure, temperature, and the like can be measured by the environmental sensor(s) 1520*e*. The environmental conditions to which the batteries are subjected may impact their long-term performance (e.g., their SOH) and their possible performance degradation over time. The environmental sensor(s) 1520*e* may, in some embodiments, help to detect conditions around the batteries as opposed to detecting conditions of the batteries themselves.

In some embodiments, the damage detection sensor(s) 1520*f* may provide data indicative of a current state for a sensor. For example, the damage detection sensor(s) 1520*f* may provide data indicative of a resistance of a mesh of resistive wires located between the battery module 108 and the bottom cover 1401*b* of the battery pack enclosure. If damage occurs to the battery pack enclosure, and also the mesh of resistive wires 1410, the value of the resistance of the mesh of wires (e.g., the sensor 1410) will change due to the change in length and/or cross-sectional area of the mesh wire. The resistance of the mesh of wires can be measured and monitored for a change by the BMS 232 to diagnose damage to the battery pack enclosure 104 and prevent thermal propagation before it occurs. If each battery module 108 in the battery pack enclosure 104 has an individual sensor 1410, the detected damage can be pinpointed to a specific battery module 108. In some embodiments, an alert indicating the location of the detected damage is sent to the vehicle 100. Alternatively or in addition to the alert, the damaged battery module 108 may be disabled.

The damage detection sensor(s) 1520*f* may be used as a source of information about a current state of a battery pack enclosure. As such, information received from the damage detection sensor(s) 1520*f* may be used by the SOH manager 1512 to detect damage to battery module(s) 108. Alternatively or additionally, the SOH manager 1512 may take the information received from the damage detection sensor(s) 1520*f* and convert that information into reportable information that describes the location of detected damage (e.g., identify the damaged battery module 108 using a unique identifier), disable the damaged battery module(s) 108, etc. In some embodiments, the damage detection sensor(s) 1520*f* may include a measurement system or collection of sensors that measure the overall resistance and/or the change in resistance of the mesh of resistive wires, and/or temperature of the battery module(s) 108 itself. As such, the sensor(s) 1520*f* may include one or many transducers that detect physical phenomena (e.g., resistance, temperature, current, voltage, etc.) and convert the detected physical phenomena into an output current, voltage, or similar type of electronic signal (which can be digital or analog).

The other SOH sensor(s) 1520N may include any other type of sensor or transducer that is useful in detecting conditions that might have an impact on battery SOH. For instance, sensors that detect battery or cell impedance, battery or cell conductance, battery or cell internal resistance, self-discharge, charge acceptance, and so on may be included on the other SOH sensor(s) 1520N.

The energy management system 1516 may accept the sensor inputs at the sensor interface(s) 1504 and carry those inputs to one or both of the SOC manager 1508 and SOH manager 1512. As the names suggest, the SOC manager 1508 is responsible for determining and reporting information related to battery state of charge whereas the SOH manager 1512 is responsible for determining and reporting information related to battery state of health.

As used herein, the SOH of a power source, battery, cell, module, or the like (generally referred to as a battery for ease of discussion) is a measurement or representation that reflects the general condition of a battery and its ability to deliver a specified performance compared with a fresh or new battery. Battery SOH takes into account such factors as charge acceptance, internal resistance, voltage and self-discharge. SOH is a measure of the long-term capability of the battery and gives an indication, rather than an absolute measurement, of how much of the available possible energy throughput of the battery has been consumed, and how much is left. Using the automotive analogy, the battery SOH for an electric or hybrid electric vehicle can be compared to the odometer display function which indicates the number of miles travelled since the vehicle was new.

As compared to SOH, the SOC of a battery represents the short-term capability of the battery. During the lifetime of a battery, its performance or health will deteriorate gradually due to irreversible physical and chemical changes which take place with usage (normal or abnormal) and with age until eventually the battery is no longer usable or dead. The SOH is an indication of the point which has been reached in the life cycle of the battery and a measure of its condition relative to a fresh or new battery. Unlike the SOC which can be determined by measuring the actual charge in the battery there is no absolute definition of the SOH. It is a subjective measure that can be derived from a variety of different measurable battery performance parameters which can be interpreted according to different rule sets. Accordingly, SOH is an estimation rather than a measurement; however, the more information related to SOH that is known or presented to a user may help in determining, with more accuracy, the relative SOH of a battery as compared to other battery SOHs. The SOH only applies to batteries after they have started their ageing process either on the shelf or once they have entered service.

In some embodiments, any parameter which changes significantly with age, such as cell impedance or conductance, can be used as a basis for providing an indication of the SOH of the cell. The types of battery or cell parameters which may be measured in connection with determining SOH include, without limitation, capacity, internal resistance, self-discharge, charge acceptance, discharge capabilities, mobility of electrolytes, and cycle-counting (e.g., number of charge and discharge cycles the battery or cell has been subjected to). The absolute readings of these parameters will likely depend on the cell chemistry involved. In some embodiments, weighting can be added to individual factors based on experience, the cell chemistry, and the importance the particular parameter in the application for which the battery is used. If any of these variables provide marginal readings, the end result will be affected. A battery may have a good capacity but the internal resistance is high. In this case, the SOH estimation will be lowered accordingly. Similar demerit points are added if the battery has high self-discharge or exhibits other chemical deficiencies. The points scored for the cell can be compared with the points assigned to a new cell to give a percentage result or figure of merit.

As can be appreciated, the logic employed by the SOC manager 1508 may be relatively simple in that any information related to current battery charge can be received from the sensor interface 1504 and promptly reported via the reporting interface(s) 1516. The information reported by the SOC manager 1508 may be provided to the instrument panel via signal path 1524, to local data storage via signal path 1528, and/or to remote server(s) via signal path 1532. The SOC manager 1508 may continuously or in response to requests report the current SOC for a battery, a set of batteries, or the like.

The SOH manager 1512, on the other hand, may be responsible for receiving and processing the information from the sensor interface(s) 1504 to calculate a SOH reading. Alternatively or additionally, the SOH manager 1512 may apply one or more report filters 1514 that enable the SOH manager 1512 to simply report desired SOH information to desired recipients. The SOH manager 1512, in some embodiments, may utilize its report filter(s) 1514 to determine that a first set of SOH information is to be transmitted to the instrument panel via signal path 1524 whereas a different set of SOH information is to be transmitted to local data storage via signal path 1528. Similarly, the SOH manager 1512 may utilize its report filters 1514 to determine that a third set of SOH information is to be transmitted to remote server via signal path 1532 for further processing and analysis.

As a non-limiting example, the SOH manager 1512 may simply report a calculated SOH to the instrument panel for presentation to a driver of the vehicle 100, whereas the SOH manager 1512 may report parameters used for calculating the SOH to local data storage and/or remote servers. The usefulness of sending the measured parameters rather than the calculated SOH value to the local data storage and/or remote servers is that the actual parameters can be logged and/or compared to previously-obtained parameters to determine long-term trends in each of the parameters. Analysis of the changes in parameters can help in determining a more accurate or representative SOH calculation. In some embodiments, it may be possible to send the SOH parameters to a remote server, which compares the parameters with historical readings of the same parameters, determines a current SOH calculation and then reports back the SOH calculation to the vehicle 100. The SOH calculation made at the remote server may then be presented to the drive of the vehicle 100 via the instrument panel.

As can be appreciated, the SOH manager 1512 may utilize a plurality of different report filters 1514 and each report filter may filter out certain types of information depending upon the desired recipient of the report, user preferences for such reports, and the like. The report filter(s) 1514 may be user-configurable or configurable by manufacturers of the batteries. The report filter(s) 1514 can be used to ensure that unnecessary or unwanted data is not sent along a particular signal path 1524, 1528, 1532, thereby preserving network and/or processing resources.

FIGS. 16A-16B illustrate a crash event involving vehicle 1601 and rock 1605 as the vehicle 601 travels on roadway 1630. As illustrated in FIG. 16B, as the rock 1605 impacts the undercarriage of the vehicle 1601, damage 1610 occurs. In some examples, damage 1610 may impact one or more battery modules 108 in the vehicle 1601.

Figure 17:
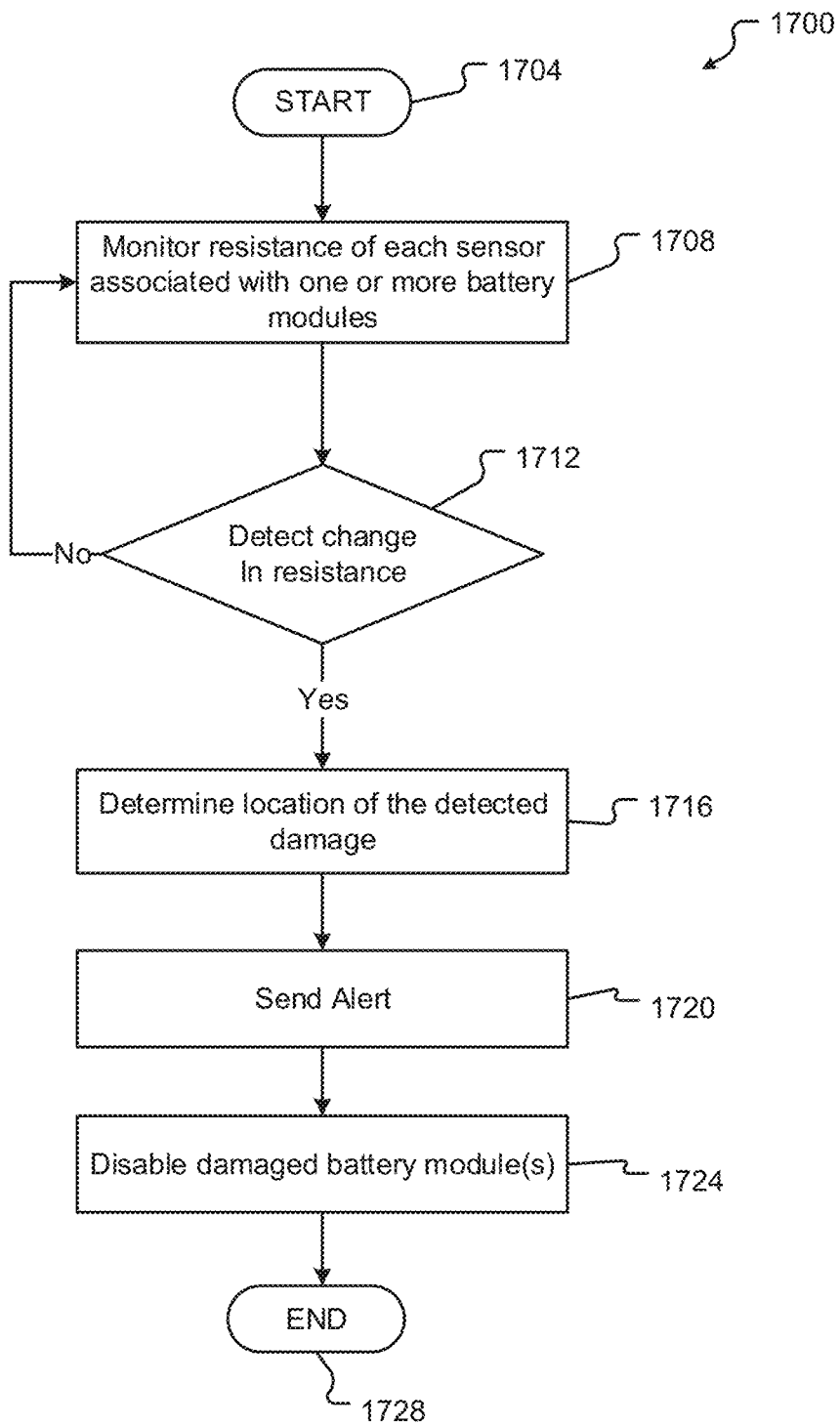
FIG. 17 is a flow diagram of a method for managing a thermal characteristic of the battery module in accordance with embodiments of the present disclosure.

FIG. 17 is a flow diagram of a method 1700 for detecting damage to battery enclosure 104 in accordance with embodiments of the present disclosure. While a general order for the steps of the method 1700 is shown in FIG. 17, the method 1700 can include more or fewer steps or can arrange the order of the steps differently than those shown in FIG. 17. Generally, the method 1700 starts with a start operation 904 and ends with an end operation 1728. The method 1700 can be executed as a set of computer-executable instructions executed by a computer system (e.g., the BMS 232, MCU 304, etc.) and encoded or stored on a computer readable medium (e.g., memory 308, etc.). Hereinafter, the method 1700 shall be explained with reference to the systems, components, assemblies, devices, environments, etc. described in conjunction with FIGS. 1-16B.

The method 1700 may begin at step 1704 and proceed by monitoring the resistance in each sensor associated with one or more battery modules 108 in battery pack enclosure 104 (step 1708). For example, battery pack enclosure 104 may include one sensor or each battery module 108 in the battery pack enclosure 104 may include its own sensor. The resistance may be monitored, or measured, via the sensors 316A-N in the battery module 108. Additionally or alternatively, it is an aspect of the present disclosure that the measurements may be made continuously, periodically, and/or on-demand (e.g., via the BMS 232, etc.). Among other things, these measurement behaviors may provide a continuous feedback loop and damage detection of the battery pack enclosure 104 and/or battery module 108 during operation.

Next, the method 1700 continues by determining if a change in resistance is detected in at least one of the sensors (step 1712). For instance, the measured resistance may be compared to a threshold resistance. In other examples, the previous measurement may be compared to the current measurement to determine if the change (+/−) exceeds a predetermined threshold. If a change above a predetermined threshold is detected for a predetermined amount of time (yes), the method 1700 proceeds to determine the location of the detected damage (step 1716). In some embodiments, each sensor has a unique identifier, which is associated with the resistance information. Using the unique identifier the BMS 232 can determine which battery module(s) is damaged (e.g., the location of the detected damage).

Next, the method 1700 continues to send an alert (step 1720). In some embodiments, a control signal may be sent by a communications module of the BMS 232. Alternatively or in addition, the damaged battery module(s) 108 may be disabled (step 1724). For example, the BMS 232 may send a signal to disable to damaged battery module(s) 108.

The exemplary systems and methods of this disclosure have been described in relation to a battery pack enclosure 104, a battery module 108, and a number of battery cells 208 in an electric vehicle energy storage system. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others. In some embodiments, the present disclosure provides an electrical interconnection device that can be used between any electrical source and destination. While the present disclosure describes connections between battery modules and corresponding management systems, embodiments of the present disclosure should not be so limited.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a battery pack enclosure for a vehicle, comprising: a plurality of battery modules, wherein each battery module includes a plurality of adjacent battery cells; a sensor between the plurality of battery modules and an inside surface of the battery pack enclosure; and an electronic control unit electronically connected to the sensor, the electronic control unit configured to monitor the sensor to detect damage to the battery pack enclosure.

Aspects of the above battery pack enclosure wherein the sensor comprises a mesh of resistive wires, and the electronic control unit monitors an overall resistance of the mesh of resistive wires.

Aspects of the above battery pack enclosure include the electronic control unit is configured to detect the damage to the battery enclosure when a change in the overall resistance of the mesh resistive wire exceeds a predetermined threshold for a predetermined time period.

Aspects of the above battery pack enclosure include the electronic control unit is configured to: determine a location of the damage to the battery enclosure; and send an alert that indicates the location of the damage to the battery enclosure.

Aspects of the above battery pack enclosure include the electronic control unit is configured to: in response to detecting the damage to the battery enclosure and determining the location of the damage to the battery enclosure, disable at least one of the plurality of battery modules based on the location of the damage to the battery enclosure.

Aspects of the above battery pack enclosure include the mesh of resistive wires formed of copper wires and a change of resistance is associated with an incident of damage to the battery enclosure.

Aspects of the above battery pack enclosure wherein the mesh of resistive wires is printed on insulation on the inside surface of the battery enclosure.

Aspects of the above battery pack enclosure wherein the electronic control unit comprises a battery management system of the vehicle, wherein the sensor comprises a plurality of sensors, each sensor comprising a corresponding mesh of resistance wires, wherein each sensor has a unique identifier and is associated spatially with a corresponding portion of a respective battery module, and wherein the electronic control unit identifies a location of the damage to the respective battery module by identifying the sensor detecting a change in overall resistance of the corresponding mesh of resistance wires.

Embodiments include a battery module for a vehicle, comprising: a plurality of adjacent battery cells; a sensor between the plurality of adjacent battery cells and an inside surface of a battery enclosure; and an electronic control unit electronically connected to the sensor, the electronic control unit configured to monitor the sensor to detect damage to the battery module.

Aspects of the above battery module wherein the sensor comprises a mesh of resistive wires, and the electronic control unit monitors an overall resistance of the mesh of resistive wires.

Aspects of the above battery module wherein the electronic control unit is configured to detect the damage to the battery enclosure when a change in the overall resistance of the mesh resistive wire exceeds a predetermined threshold for a predetermined time period.

Aspects of the above battery module wherein the electronic control unit is configured to: determine a location of the damage to the battery enclosure; and send an alert that indicates the location of the damage to the battery enclosure.

Aspects of the above battery module wherein the electronic control unit is configured to: in response to detecting the damage to the battery enclosure and determining the location of the damage to the battery enclosure, disable at least one of the plurality of battery modules based on the location of the damage to the battery enclosure.

Aspects of the above battery module wherein the mesh of resistive wires formed of copper wires and a change of resistance is associated with an incident of damage to the battery enclosure.

Aspects of the above battery module wherein the mesh of resistive wires is printed on insulation on the inside surface of the battery enclosure.

Aspects of the above battery module wherein the electronic control unit comprises a battery management system of the vehicle, wherein the sensor comprises a plurality of sensors, each sensor comprising a corresponding mesh of resistance wires, wherein each sensor has a unique identifier and is associated spatially with a corresponding portion of a respective battery module, and wherein the electronic control unit identifies a location of the damage to the respective battery module by identifying the sensor detecting a change in overall resistance of the corresponding mesh of resistance wires.

Embodiments include a method for detecting damage to a battery enclosure, monitoring a sensor between a plurality of adjacent battery modules and an inside surface of a battery enclosure; and detecting damage to the battery enclosure.

Aspects of the above method wherein the sensor comprises a mesh of resistive wires, and the monitoring an overall resistance of the mesh of resistive wires.

Aspects of the above method wherein the detecting the damage to the battery enclosure comprises detecting a change in the overall resistance of the mesh resistive wire exceeds a predetermined threshold for a predetermined time period.

Aspects of the above method further comprising: determining a location of the damage to the battery enclosure; and sending an alert that indicates the location of the damage to the battery enclosure.

Aspects of the above method further comprising: in response to detecting the damage to the battery enclosure and determining the location of the damage to the battery enclosure, disabling at least one of the plurality of battery modules based on the location of the damage to the battery enclosure.

Aspects of the above method wherein the mesh of resistive wires formed of copper wires and a change of resistance is associated with an incident of damage to the battery enclosure.

Aspects of the above method wherein the mesh of resistive wires is printed on insulation on the inside surface of the battery enclosure.

Aspects of the above method wherein the sensor comprises a plurality of sensors, each sensor comprising a corresponding mesh of resistance wires, wherein each sensor has a unique identifier and is associated spatially with a corresponding portion of a respective battery module, and wherein determining the location of the damage to the battery enclosure comprises identifying the sensor detecting a change in overall resistance of the corresponding mesh of resistance wires.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A battery pack enclosure for a vehicle, comprising:
   a plurality of battery modules, wherein each battery module includes a plurality of adjacent battery cells;
   a sensor comprising a mesh of resistive wires,
   wherein the sensor is provided between the plurality of adjacent battery cells and a bottom cover of the battery pack enclosure; and
   an electronic control unit electronically connected to the sensor, the electronic control unit configured to detect damage to the battery pack enclosure,
   wherein the electronic control unit monitors an overall resistance of the mesh of resistive wires, and
   wherein a change in the overall resistance of the mesh of resistive wires indicates damage to the battery pack enclosure.

2. The battery pack enclosure of claim 1, wherein the sensor is disposed below the battery pack enclosure.

3. The battery pack enclosure of claim 1, wherein the electronic control unit is further configured to detect the damage to the battery pack enclosure when the change in the overall resistance of the mesh of resistive wires exceeds a predetermined threshold for a predetermined time period.

4. The battery pack enclosure of claim 1, wherein the electronic control unit is further configured to:
   detect the damage to the battery pack enclosure; and
   in response to detecting the damage to the battery pack enclosure:
   determine a location of the damage to the battery pack enclosure; and
   send an alert that indicates the location of the damage to the battery pack enclosure.

5. The battery pack enclosure of claim 4, wherein the electronic control unit is further configured to:
   in response to detecting the damage to the battery pack enclosure and determining the location of the damage to the battery pack enclosure, disable at least one of the plurality of battery modules based on the location of the damage to the battery pack enclosure.

6. The battery pack enclosure of claim 2, wherein the mesh of resistive wires is formed of copper wires.

7. The battery pack enclosure of claim 1, wherein the mesh of resistive wires is printed on insulation of the bottom cover of the battery pack enclosure.

8. The battery pack enclosure of claim 1, wherein the electronic control unit comprises a battery management system of the vehicle, wherein the sensor comprises a plurality of sensors, each sensor comprising a corresponding mesh of resistance wires, wherein each sensor has a unique identifier and is associated spatially with a corresponding portion of a respective battery module, and wherein the electronic control unit identifies a location of the damage to the respective battery module by identifying the sensor detecting the change in the overall resistance of the corresponding mesh of resistance wires.

9. A battery module for a vehicle, comprising:
   a plurality of adjacent battery cells;
   a sensor comprising a mesh of resistive wires,
   wherein the sensor is provided between the plurality of adjacent battery cells and a bottom cover of the battery module; and
   an electronic control unit electronically connected to the sensor, the electronic control unit configured to detect damage to the battery module, wherein the electronic control unit monitors an overall resistance of the mesh of resistive wires, and wherein a change in the overall resistance of the mesh of resistive wires indicates damage to the battery module.

10. The battery module of claim 9, wherein the sensor is disposed below the battery module.

11. The battery module of claim 9, wherein the electronic control unit is configured to detect the damage to the battery module when the change in the overall resistance of the mesh of resistive wires exceeds a predetermined threshold for a predetermined time period.

12. The battery module of claim 9, wherein the electronic control unit is further configured to:
  detect the damage to the battery module; and
  in response to detecting the damage to the battery module:
  determine a location of the battery module; and
  send an alert that indicates the location of the damaged battery module.

13. The battery modules of claim 12, wherein the electronic control unit is further configured to:
  in response to determining the location of the damaged battery module,
  disabling the damaged battery module.

14. The battery module of claim 10, wherein the mesh of resistive wires is formed of copper wires.

15. The battery module of claim 9, wherein the electronic control unit comprises a battery management system of the vehicle, wherein the sensor comprises a plurality of sensors, each sensor comprising a corresponding mesh of resistance wires, wherein each sensor has a unique identifier and is associated spatially with a corresponding portion of a respective battery module, and wherein the electronic control unit identifies a location of the damage to the respective battery module by identifying the sensor detecting the change in the overall resistance of the corresponding mesh of resistance wires.

16. A method of detecting damage to a battery enclosure for a vehicle, the method comprising:
  monitoring a sensor, wherein the sensor comprises a mesh of resistive wires, wherein the battery enclosure comprises a plurality of battery modules, wherein each battery module of the plurality of battery modules includes a plurality of adjacent battery cells, and wherein the sensor is provided between the plurality of adjacent battery cells and a bottom cover of the battery enclosure; and
  detecting damage to the battery enclosure by monitoring an overall resistance of the mesh of resistive wires, wherein a change in the overall resistance of the mesh of resistive wires indicates damage to the battery enclosure.

17. The method of claim 16, wherein the sensor is disposed below the battery enclosure.

18. The method of claim 16, wherein detecting the damage to the battery enclosure comprises detecting the change in the overall resistance of the mesh of resistive wires exceeds a predetermined threshold for a predetermined time period.

19. The method of claim 18, further comprising:
  determining a location of the damage to the battery enclosure; and
  sending an alert that indicates the location of the damage to the battery enclosure.

20. The method of claim 19, further comprising:
  in response to detecting the damage to the battery enclosure and determining the location of the damage to the battery enclosure, disabling at least one of the plurality of battery modules based on the location of the damage to the battery enclosure.

\* \* \* \* \*